United States Patent
Brunel et al.

(10) Patent No.: US 7,885,673 B2
(45) Date of Patent: Feb. 8, 2011

(54) TRANSMISSION METHOD IN A WIRELESS TELECOMMUNICATION SYSTEM INCLUDING AT LEAST A BASE STATION INTENDED TO COMMUNICATE WITH TERMINALS

(75) Inventors: Loic Brunel, Rennes Cedex 7 (FR); David Mottier, Rennes Cedex 7 (FR)

(73) Assignee: Mitsubishi Electric Corporation, Tokyo (JP)

( * ) Notice: Subject to any disclaimer, the term of this patent is extended or adjusted under 35 U.S.C. 154(b) by 637 days.

(21) Appl. No.: 11/925,385

(22) Filed: Oct. 26, 2007

(65) Prior Publication Data
US 2008/0102753 A1 May 1, 2008

(30) Foreign Application Priority Data
Oct. 30, 2006 (EP) .................. 06022611

(51) Int. Cl.
H04B 15/00 (2006.01)
(52) U.S. Cl. .................. 455/506; 455/504; 455/18; 455/450; 370/509; 370/508
(58) Field of Classification Search .......... 455/506.504, 455/18, 450, 455, 464; 370/509, 508, 510, 370/512, 517, 519, 336, 337, 345, 441, 442
See application file for complete search history.

(56) References Cited

U.S. PATENT DOCUMENTS

| | | | | |
|---|---|---|---|---|
| 6,633,559 B1 * | 10/2003 | Asokan et al. | ............. | 370/350 |
| 6,810,023 B1 | 10/2004 | Dillinger et al. | | |
| 2007/0025264 A1 * | 2/2007 | Cheng et al. | ............. | 370/252 |
| 2008/0056116 A1 * | 3/2008 | Ge et al. | ............. | 370/203 |
| 2008/0101262 A1 * | 5/2008 | Brunel et al. | ............. | 370/278 |
| 2008/0240003 A1 * | 10/2008 | Brunel et al. | ............. | 370/281 |

FOREIGN PATENT DOCUMENTS

| | | |
|---|---|---|
| EP | 1 233 566 A1 | 8/2002 |
| WO | WO 99/11004 | 3/1999 |

* cited by examiner

*Primary Examiner*—Minh D Dao
(74) *Attorney, Agent, or Firm*—Oblon, Spivak, McClelland, Maier & Neustadt, L.L.P.

(57) ABSTRACT

The present invention concerns a transmission method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to at least two terminals, wherein the transfer of at least one supplementary symbol between the base station and at least one terminal that can receive or transmit said at least one supplementary symbol is enabled. The base station forms a first group of terminals and at least another group of at least one terminal, the first group of terminals comprising at least terminals which can not receive and/or transmit said at least supplementary symbol, the other group of at least one terminal comprising at least a terminal which can receive and/or transmit said at least supplementary symbol during the time delay, allocates multiplexing resources of the wireless telecommunication network to at least a part of the terminals comprised in the first group, allocates all the multiplexing resources allocated to the terminals comprised in the first group to one terminal comprised in the other group for at least one supplementary symbol.

23 Claims, 9 Drawing Sheets

| | 1051 | 1052 | 1053 | 1054 | 1055 | 1056 |
|---|---|---|---|---|---|---|
| 1001 | TE1 | TE1 | TE1 | TE1 | TE3 | TE3 |
| 1002 | TE1 | TE1 | TE1 | TE1 | TE3 | TE3 |
| 1003 | TE1 | TE1 | TE1 | TE1 | TE3 | TE3 |
| 1004 | TE2 | TE2 | TE2 | TE2 | TE3 | TE3 |
| 1005 | TE2 | TE2 | TE2 | TE2 | TE3 | TE3 |
| 1006 | TE2 | TE2 | TE2 | TE2 | TE3 | TE3 |
| 1007 | TE3 | TE3 | TE3 | TE3 | TE3 | TE3 |
| 1008 | TE3 | TE3 | TE3 | TE3 | TE3 | TE3 |
| 1009 | TE3 | TE3 | TE3 | TE3 | TE3 | TE3 |
| 1010 | TE1 | TE1 | TE1 | TE1 | TE3 | TE3 |
| 1011 | TE1 | TE1 | TE1 | TE1 | TE3 | TE3 |
| 1012 | TE1 | TE1 | TE1 | TE1 | TE3 | TE3 |

| | 1151 | 1152 | 1153 | 1154 | 1155 | 1156 |
|---|---|---|---|---|---|---|
| 1101 | TE1 | TE1 | TE1 | TE1 | TE2 | TE3 |
| 1102 | TE1 | TE1 | TE1 | TE1 | TE2 | TE3 |
| 1103 | TE1 | TE1 | TE1 | TE1 | TE2 | TE3 |
| 1104 | TE2 | TE2 | TE2 | TE2 | TE2 | TE3 |
| 1105 | TE2 | TE2 | TE2 | TE2 | TE2 | TE3 |
| 1106 | TE2 | TE2 | TE2 | TE2 | TE2 | TE3 |
| 1107 | TE3 | TE3 | TE3 | TE3 | TE2 | TE3 |
| 1108 | TE3 | TE3 | TE3 | TE3 | TE2 | TE3 |
| 1109 | TE3 | TE3 | TE3 | TE3 | TE2 | TE3 |
| 1110 | TE1 | TE1 | TE1 | TE1 | TE2 | TE3 |
| 1111 | TE1 | TE1 | TE1 | TE1 | TE2 | TE3 |
| 1112 | TE1 | TE1 | TE1 | TE1 | TE2 | TE3 |

| ID TE1 | 111000000111 | /1301 |
|---|---|---|
| ID TE2 | 000111000000 | /1302 |
| ID TE3 | 000000111000 | /1303 |

Fig. 13a

| 01 | ID TE1 |
|---|---|
| 10 | ID TE2 |
| 11 | ID TE3 |

Fig. 13c

| 0 | /1307 |
|---|---|
| 0 | /1308 |
| 1 | /1309 |

Fig. 13d 1305  1306

| 1 | 01 |
|---|---|
| 2 | 01 |
| 3 | 01 |
| 4 | 10 |
| 5 | 10 |
| 6 | 10 |
| 7 | 11 |
| 8 | 11 |
| 9 | 11 |
| 10 | 01 |
| 11 | 01 |
| 12 | 01 |

| 100 |
|---|
| 100 |
| 110 |

Fig. 13e 1310  1311

| 0 | 0 |
|---|---|
| 1 | 0 |
| 0 | 1 |

TRANSMISSION METHOD IN A WIRELESS TELECOMMUNICATION SYSTEM INCLUDING AT LEAST A BASE STATION INTENDED TO COMMUNICATE WITH TERMINALS

The present invention relates generally to telecommunication systems and in particular, to transmission methods and devices in a wireless telecommunication system including at least a base station intended to communicate with terminals over bidirectional communication channels.

Note that wireless telecommunication systems include mobile telecommunication systems in which mobile terminals may move over long distances and sometimes quickly but also telecommunication systems in which the terminals are fixed or may only move over short distances relative to the base station which they are connected to and often very slowly.

FIG. 1 diagrammatically shows a wireless cellular telecommunication system serviced by plural base stations. In the FIG. 1 only one base station BTS is depicted, the base station BTS intends to communicate with at least one terminal, here three terminals TE1, TE2 and TE3, over wireless communication channels CH1 to CH3 respectively.

In the FIG. 1, the terminal TE1 is at a distance d1 from the base station BTS, the terminal TE2 is at a distance d2 from the base station BTS and the terminal TE3 is at a distance d3 from the base station BTS. The area covered by a base station BTS is generally called a cell 15, the border of said cell being at a distance of the base station considered as maximal.

Each channel Chi, with i=1 to 3, is intended to support an uplink channel UL for carrying information from the terminal TEi to the base station BTS and a downlink channel DLi for carrying information from the base station BTS to the terminal TEi. Said information is enclosed within frames split into time slots or sub frames allocated either to the uplink channel ULi or to the downlink channel DLi.

The frame is for example of the type depicted in FIG. 4, i.e. of the HD/OFDM type (standing for Half Duplex/Orthogonal Frequency Division Multiplex/OFDM) either TDD/OFDM (Time Division Duplex/OFDM) or FDD/OFDM (Frequency Division Duplex). As it can be seen at FIG. 4, this frame is subdivided into an integer number L of time slots or sub frames TS1 to TSL that can be allocated either to the downlink channel DL or to the uplink channel UL. Furthermore, each sub frame TSj (j=1 to L) supports $q_j$ symbols s1 to $sq_j$ (here, for the sub frame TSj, $q_j$=4), called OFDM symbols, respectively carried by k orthogonal modulation frequencies f1 to fk.

Note that each of the OFDM symbols s1 to $sq_j$ in a sub frame TSj generally includes a cyclic prefix that is used to combat inter-symbol interference.

It must be understood that in a general case the number of symbols per sub frame can vary from a sub frame to another.

In relation with FIG. 5 let's consider the transmission at time te of $q_j$=four symbols s1 to s4 over the downlink channel DL by a base station BTS. These symbols s1 to s4 are received by a terminal TE1 at the border of the considered cell 15 (at a distance d1 from the base station BTS) at a time equal to te+RTD(d1)/2, where RTD(d1) is the Round Trip Delay for that terminal TE1 at said distance d1 from the base station BTS. These symbols are processed by the terminal TE1 which then may transmit also symbols over the uplink channel UL. Before transmitting symbols over the uplink channel UL, a terminal TEi has to wait for a period of time, said Receive Transmit Switch time or simply switching time and referred to as RTS, in order to take into account the duration of hardware and software operations. For instance, this delay RTS is the maximum of the time needed by hardware equipments of the terminals TE to switch between reception and transmission modes and the time needed by hardware equipments of the base station BTS to switch between transmission and reception modes. The symbols transmitted over the uplink channel UL are received at the base station BTS at a time tr equal to te+RTD(d1)+RTS+$D_{DL}$, $D_{DL}$ being the total duration of the $q_j$ symbols. It can thus be seen that the base station BTS has to wait for the reception of the symbols transmitted by a terminal TEi located at the border of the cell 15 in order to perform the processing thereof. The waiting time is called the Guard Period GP or idle period and must be equal at least to the round trip delay RTD(d1) plus the Receive Transmit Switch time RTS.

When a single terminal is involved in the present invention, it is named terminal TEi, with i=1 or 2 or 3 and so on up to the maximum number of terminals comprised in the coverage area of the Base station BTS.

When at least two terminals are involved in the present invention, they are named terminals TE.

Guard periods GP between downlink channels DL and uplink channels UL can be seen on FIG. 4.

The base station BTS determines a timing delay TD(d) for each of the terminals TE. The base station BTS transfers symbols to terminals TE which may transfer in response symbols to the base station BTS. These symbols are as example pilot symbols.

The timing delay is calculated using the following formula:

$TD(d)=tr-te-D_{DL}-RTD(d)=GP-RTD(d)$, where $d$ is the distance between each terminal TEi and the base station BTS.

From each timing delay, the base station BTS determines the Timing Advance TA=GP−TD(d) for each terminal and transfers the Timing Advance to the correspondent terminal TEi.

Each terminal applies its Timing Advance value for the transmission of symbols over the uplink channel UL in such a manner that the transmitted symbols are received at the base station BTS from terminals TE connected thereto at the same time tr.

The problem addressed by the telecommunication system afore described is related to a potential loss of resources resulting from the fact that during the guard period GP no information of any sort is transmitted or received at the base station.

In order to solve that problem, the inventors of the present invention have proposed in the European patent application EP 05291972 a new transmission scheme of information in the downlink channel or in the uplink channel.

In the patent application EP05921972, the base station BTS transmits at least a supplementary downlink symbol during the guard period to terminals TE that can receive said at least supplementary downlink symbol thereof and/or the base station BTS receives during the guard period at least a supplementary uplink symbol from terminals TE that can transmit said at least supplementary uplink symbols during the time delay thereof.

Such technique is described in more details in reference to the FIG. 6.

In the FIG. 6, $n_{ref}$ symbols s1 to s4 are transferred in a nominal part of a sub frame over the downlink channel DL by the base station BTS at a time referred to as te.

The nominal part of a sub frame is the total duration of the $q_j$ symbols which can be transmitted to terminals TE which are located at the border of the cell or in other words to any terminal located in the cell of the base station BTS.

After having transmitted the last downlink symbol s4 of the nominal part of a sub frame, the base station BTS has to wait during the guard period GP, up to time tr, for receiving uplink symbols from terminals TE connected thereto. The duration of the nominal part of a sub frame in the downlink channel is referred to as Dref corresponding to reference number $n_{ref}$ of symbols, for example four.

The base station BTS is provided for including supplementary downlink symbols in a downlink sub frame, said supplementary downlink symbols being intended to be transmitted only to the terminals TE that can receive and process them during the respective time delay thereof.

If for a terminal situated at a distance d from a base station BTS, the time delay TD(d) is comprised between the duration of a number $n_{dl}$ of downlink symbols and the duration of a number $n_{dl}+1$ of downlink symbols, respectively plus the switching time RTS, the base station BTS can insert information for that terminal in $n_{dl}$ supplementary downlink symbols. This condition can be mathematically written as follows:

$$\text{if } n_{dl} \cdot ts_{dl} \leq TD(d) - RTS < (n_{dl}+1) ts_{dl} \text{ then insert at most } n_{dl} \text{ supplementary symbols.}$$

$ts_{dl}$ being the duration of one downlink symbol.

When inserting information for a terminal TEi in $n_{dl}$ supplementary downlink symbols, the base station BTS indicates this insertion to that terminal TEi (by way of signalling) in order to enable the terminal TEi to read and process this $n_{dl}$ supplementary symbol or these $n_{dl}$ supplementary symbols along with the other symbols comprised in the nominal part of the downlink sub frame.

The base station BTS informs each terminal TEi connected thereto about the time delay TD or the Timing Advance it has to apply. Then, each terminal TEi, by using the just above expression, deduces from the value of the time delay TD or from the value of the Timing Advance the number of symbols that it has to read and to process.

The number $n_{dl}$ of supplementary downlink symbols that the base station BTS can allocate to a terminal TEi at a distance d of the base station BTS is thus determined in the following way:

$$n_{dl} = \text{integer}\{(TD(d)-RTS)/ts_{dl}\} = \text{integer}\{(GP-RTD(d)-RTS)/ts_{dl}\}$$

The maximum number $N_{dl}\text{max}$ of supplementary symbols is given for a terminal TEi that would be located at a zero distance from the base station BTS and for which the round trip delay RTD is zero:

$$N_{dl}\text{max} = \text{integer}\{(GP-RTS)/ts_{dl}\}$$

Similar formulas as the above mentioned formulas are used for supplementary uplink channels.

As example, in the case depicted in FIG. 6, as the number $N_{dl}\text{max}$ is two, the total number of transmitted downlink symbols is now equal to four downlink symbols s1 to s4 of the nominal part Dref of a sub frame and two supplementary downlink symbols s5 and s6 that are transmitted in the period that is usually considered as a guard period GP. The value of the time delay TD(d1) for a terminal TE1 at the border of the cell 15, is equal to the switching time RTS in virtue of the definition of the time delay. Only the four downlink symbols s1 to s4 of the nominal part Dref of a sub frame are allocated by the base station BTS to said terminal TE1. The terminal TE1 only reads and processes those four downlink symbols s1 to s4, the two supplementary symbols s5 and s6, if any, being ignored or not processed.

The value of the time delay TD(d2) for the terminal TE2 is smaller than the duration of two downlink symbols plus the switching time but is however equal to the duration of one downlink symbol plus the switching time RTS. So, the base station BTS can transmit information to that terminal TE2 within at most one supplementary downlink symbol (here the downlink symbol s5 which follows the last downlink symbol s4 of the nominal part Dref of a sub frame) which is read and processed by said terminal TE2. Symbol s6, if any, is ignored by said terminal TE2 or not processed. In this case, the total number of downlink symbols that can include information for that terminal TE2 is five (the four of the nominal part Dref of a sub frame s1 to s4 plus one supplementary symbol s5).

According to the example of the FIG. 6, the value of the time delay TD(d3) for the terminal TE3 is equal to the duration of two downlink symbols plus the switching time RTS. So, the base station BTS can transmit information to that terminal TE3 within at most two supplementary downlink symbols s5 and s6 which are read and processed by said terminal TE3. The total number of downlink symbols that include information for that terminal TE3 is six (four of the nominal part Dref of a sub frame s1 to s4 plus two supplementary downlink symbols s5 and s6).

The base station BTS can transmit information to any terminal TEi located at a distance d of the base station comprised between the distance d2 of the terminal TE2 and the distance d3 of the terminal TE3 within at most five downlink symbols that it can read and process. In the same way, the base station BTS can transmit information to any terminal located at a distance d shorter than the distance d3 of the terminal TE3 within at most six downlink symbols that it can read and process. Always in the same way, the base station BTS can transmit information to any terminal located at a distance d larger than the distance d2 of the terminal TE2 within at most four symbols that it can read and process.

Note that the downlink symbol s5 may contain information only for the terminals TE that are located at a distance from the base station BTS lower than d2 whereas downlink symbol s6 may contain information only for the terminals TE that are located at a distance from the base station BTS lower than d3.

When a terminal TEi gets connected to the base station BTS, no information about the time delay TD it has to apply has been received. As long as it is not done, the number of symbols allocated to this terminal TEi is equal to the reference number $n_{ref}$ i.e. the number of symbols allocated to this terminal TEi is equal to the number of symbols comprised in the nominal part Dref of the sub frame. Furthermore, the terminal TEi may transmit in the uplink with a predefined time delay, for instance equal to the guard period GP or to RTS, after receiving a number of symbols equal to the reference number $n_{ref}$.

In the European patent application EP 05291972, when the base station uses modulation, coding and/or multiplexing schemes for the supplementary symbols that are different from those that it uses for the symbols of the nominal part Dref of the sub frame, the base station transmits specific control information to the terminals TE that can receive that supplementary symbols for the terminals TE to detect, decode and/or de-multiplex said supplementary symbols.

The transfer of such control information is consuming in term of resources of the wireless telecommunication system.

To that end, the present invention concerns a transmission method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to at least two terminals, said method including the steps executed by the base station of:

determining the time delay of each terminal connected thereto, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance, enabling the transfer of at least one supplementary symbol between the base station and at least one terminal that can receive or transmit said at least one supplementary symbol during the time delay, the method being characterised in that it comprises further steps of:

forming a first group of terminals and at least another group of at least one terminal, the first group of terminals comprising at least terminals which can not receive and/or transmit said at least supplementary symbol during the time delay, the other group of at least one terminal comprising at least a terminal which can receive and/or transmit said at least supplementary symbol during the time delay, allocating multiplexing resources of the wireless telecommunication network to at least a part of the terminals comprised in the first group for a sub frame, allocating all the multiplexing resources allocated to the terminals comprised in the first group to one terminal comprised in the other group for at least one supplementary symbol, transferring at least one control information which convey information indicating the allocated multiplexing resources to the terminals.

The present invention concerns also a base station of a wireless telecommunication system, said base station being intended to communicate with terminals over communication channels, each channel carrying frames being divided into downlink sub frames and uplink sub frames, each downlink sub frame including a number of symbols intended to be transmitted to at least two terminals, said base station comprises:

means for determining the time delay of each terminal connected thereto, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance, means for enabling the transfer of at least one supplementary symbol between the base station and at least one terminal that can receive or transmit said at least one supplementary symbol during the time delay, the base station being characterised in that it further comprises means for forming a first group of terminals and at least another group of at least one terminal, the first group of terminals comprising at least terminals which can not receive and/or transmit said at least supplementary symbol during the time delay, the other group of at least one terminal comprising at least a terminal which can receive and/or transmit said at least supplementary symbol during the time delay, means for allocating multiplexing resources of the wireless telecommunication network to at least a part of the terminals comprised in the first group for a sub frame, means for allocating all the multiplexing resources allocated to the terminals comprised in the first group to one terminal comprised in the other group for at least one supplementary symbol, means for transferring at least one control information which convey information indicating the allocated multiplexing resources to the terminals.

By allocating all the multiplexing resources allocated to the terminals comprised in the first group to one terminal comprised in the other group for at least one supplementary symbol, few control information need to be transferred by the base station.

Thus, the transfer of such control information is not consuming in term of resources of the wireless telecommunication system.

Furthermore, the resources of the wireless telecommunication system are used efficiently.

According to a particular feature, the multiplexing resources of the wireless telecommunication network are chunks of frequencies and/or codes and/or areas of a coverage area of the base station.

According to a particular feature, the symbols included in the downlink sub frame that all terminals can receive are comprised in a nominal part of the downlink sub frame, and a first control information which convey information indicating the allocated multiplexing resources is transferred to each terminal, the control information being multiplexed with data in order to form at least one symbol comprised in the nominal part of the downlink sub frame.

According to a particular feature, the base station determines the number of supplementary symbols that can be received or transmitted by each terminal.

According to a particular feature, the first group comprises all the terminals and the at least one other group is a second group which comprises the terminals which can receive or transmit the maximum number of supplementary symbols.

Thus, the determination of the terminals which belong to the other group is simple to realise.

According to a particular feature, the multiplexing resources allocated to one terminal comprised in the other group are allocated for the maximum number of supplementary symbols.

Thus, the indication of the allocation of the multiplexing resources for the supplementary symbols is not consuming in term of resources of the wireless telecommunication system.

According to a particular feature, a second control information is transferred, the second control information is multiplexed with data in order to form at least one symbol comprised in the nominal part of the downlink sub frame or is multiplexed with data in order to form at least one first supplementary symbol.

Thus, the other terminal can be aware of the multiplexing resources which have been allocated to it as soon as possible. If the second control information is multiplexed with data in order to form at least one, as example the first supplementary symbol, the symbols comprised in the nominal part of the downlink sub frame comprise only data related to terminals which do not have to process at least one supplementary symbol.

According to a particular feature, the second control information comprises, for each terminal, a single field which indicates if all the multiplexing resources allocated to the terminals comprised in the first group are allocated to the terminal for all the supplementary symbols.

Thus, the indication of the allocation of the multiplexing resources for the supplementary symbols is not consuming in term of resources of the wireless telecommunication system.

According to a particular feature, the second control information comprises, for each terminal, a single field which indicates at least the number of supplementary symbols, the terminal can transmit and/or receive.

Thus, the indication of the allocation of the multiplexing resources for the supplementary symbols is not consuming in term of resources of the wireless telecommunication system and the detection of the number of supplementary symbols is more robust.

According to a particular feature, the first group comprises all the terminals and plural other groups are formed, at least a second group which comprises the terminals which can receive and/or transmit a first number of supplementary symbols and a third group which comprises the terminals which can receive and/or transmit a second number of supplementary symbols.

Thus, the allocation of supplementary symbols can be made to several terminals.

According to a particular feature, the first group comprises a part of the terminals which can receive at most a first number of supplementary symbols during the time delay and plural other groups are formed, at least a second group which comprises the terminals which can receive and/or transmit the first number of supplementary symbols and a third group which comprises the terminals which can receive and/or transmit a second number of supplementary symbols.

Thus, the determination of the terminals which belong to the second and/or the third groups is simple to realise.

According to a particular feature, the multiplexing resources allocated to one terminal comprised in the second group are allocated for the first number of supplementary symbols and the multiplexing resources allocated to another terminal comprised in the third group are allocated for the second number of supplementary symbols.

Thus, the allocation is simple to realise.

According to a particular feature, a second control information is transferred, the second control information is multiplexed with data in order to form at least one symbol comprised in the nominal part of the downlink sub frame or is multiplexed with data in order to form at least one supplementary symbol or a part of the control information is multiplexed with data in order to form at least one supplementary symbol and another part of the control information is multiplexed with data in order to form at least one other supplementary symbol.

According to a particular feature, the second control information comprises, for each terminal, plural fields, at least a first field which indicates if the terminal can use, for the first number of supplementary symbols, all the multiplexing resources which are allocated to the terminals comprised in the first group and a second field which indicates if the terminal can use, for the second number of supplementary symbols, all the multiplexing resources which are allocated to the terminals comprised in the first group.

Thus, the control of each supplementary symbol does not consume the resources of other supplementary symbols. If a part of the second control information is multiplexed with data in order to form, as example, the first supplementary symbol, the symbols comprised in the nominal part of the downlink sub frame or, as example, in the first supplementary symbol comprise only data related to terminals which do not have to process the other supplementary symbol.

According to still another aspect, the present invention concerns a transmission method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to plural terminals, the terminal being able to transfer and/or receive at least one supplementary symbol during a time delay, the time delay being such that any terminal after receiving all the symbols included in a downlink sub frame followed by an uplink sub frame may transmit other symbols over said uplink sub frame with said time delay so that the other symbols susceptible to be transmitted should be received by the base station at a time separated from the end of the transmission by the base station of the downlink sub frame by a predefined guard period constant whatever said distance, said method including the steps executed by the terminal of:

receiving from the base station symbols comprising at least a first and a second control information which convey information indicating the multiplexing resources allocated to the terminal, reading at least one field of the first control information comprising information indicating the multiplexing resources which may be allocated to the terminal for a sub frame, multiplexing and/or de-multiplexing symbols included into a sub frame according to the allocated multiplexing resources for the multiplex and/or the de multiplex of the symbols included into an uplink and/or a downlink sub frame if multiplexing resources are allocated to the terminal, reading at least one field of the second control information comprising information indicating if all the multiplexing resources allocated to other terminals for a sub frame are allocated to the terminal for at least one supplementary symbol, multiplexing and/or de-multiplexing the at least one supplementary symbol if all the multiplexing resources are allocated to the terminal for the at least one supplementary symbol.

According to still another aspect, the present invention concerns a terminal of a wireless telecommunication system being intended to communicate with a base station over communication channels, each channel carrying frames being divided into downlink sub frames and uplink sub frames, each downlink sub frame including a number of symbols intended to be transmitted to plural terminals, the terminal being able to transfer and/or receive at least one supplementary symbol during a time delay, the time delay being such that any terminal after receiving all the symbols included in a downlink sub frame followed by an uplink sub frame may transmit other symbols over said uplink sub frame with said time delay so that the other symbols susceptible to be transmitted should be received by the base station at a time separated from the end of the transmission by the base station of the downlink sub frame by a predefined guard period constant whatever said distance, said terminal comprises:

means for receiving from the base station symbols comprising at least a first and a second control information which convey information indicating the multiplexing resources allocated to the terminal, means for reading at least one field of the first control information comprising information indicating the multiplexing resources which may be allocated to the terminal for a sub frame, means for multiplexing and/or de-multiplexing symbols included into an uplink and/or a downlink sub frame according to the allocated multiplexing resources for the multiplex and/or the de multiplex of the symbols included into an uplink and/or a downlink sub frame if multiplexing resources are allocated to the terminal, means for reading at least one field of the second control information comprising information indicating if all the multiplexing resources allocated to other terminals for a sub frame are allocated to the terminal for at least one supplementary symbol, means for multiplexing and/or de-multiplexing the at least one supplementary symbol if all the multiplexing resources are allocated to the terminal for the at least one supplementary symbol.

According to a particular feature, the symbols included in the downlink sub frame that all terminals can receive are comprised in a nominal part of the downlink sub frame, and the second control information is multiplexed with data in order to form at least one symbol comprised in the nominal part of the downlink sub frame or is multiplexed with data in order to form at least one supplementary symbol.

According to a particular feature, the second control information comprises a single field which indicates if all the multiplexing resources are allocated to the terminal for the at least one supplementary symbol.

According to a particular feature, the second control information comprises a single field which indicates at least the number of supplementary symbols the terminal can transmit and/or receive.

According to a particular feature, the symbols included in the downlink sub frame that all terminals can receive are comprised in a nominal part of the downlink sub frame, and the second control information is multiplexed with data in order to form at least one symbol comprised in the nominal part of the downlink sub frame or is multiplexed with data in order to form at least one supplementary symbol or a part of the control information is multiplexed with data in order to form at least one supplementary symbol and another part of the control information is multiplexed with data in order to form at least one other supplementary symbol.

According to still another aspect, the present invention concerns a control information transferred by a base station of a wireless telecommunication system to at least two terminals, the base station intending to communicate with terminals over bidirectional communication channels, each channel supporting frames being divided into downlink sub frames and uplink sub frames, each downlink sub frame including a number of symbols intended to be transmitted to at least two terminals, the terminals being susceptible to transmit other symbols over said uplink sub frame with a time delay so that the other symbols susceptible to be transmitted should be received by said base station at a time separated from the end of the transmission by the base station of the downlink sub frame by a predefined guard period constant whatever the distance separating each terminal from the base station, characterised in that the control information comprises information indicating if all the multiplexing resources allocated to terminals for the reception and/or the transfer of symbols into a sub frame are or not allocated to the terminal for at least one supplementary symbol to be received and/or transferred during said time delay.

According to a particular feature, the multiplexing resources allocated to the terminal are allocated for plural supplementary symbols.

According to a particular feature, the symbols included in the downlink sub frame that all terminals can receive are comprised in a nominal part of the downlink sub frame, and the control information is multiplexed with data in order to form at least one symbol of the nominal part of the downlink sub frame or is multiplexed with data in order to form at least one supplementary symbol.

According to a particular feature, the control information comprises, for each terminal, a single field which indicates if all the multiplexing resources allocated to terminals for the reception and/or the transfer of symbols into a sub frame are or not allocated to the terminal for at least one supplementary symbol.

According to a particular feature, the symbols included in the downlink sub frame that all terminals can receive are comprised in a nominal part of the downlink sub frame and the control information is multiplexed with data in order to form at least one symbol of the nominal part of the downlink sub frame or is multiplexed with data in order to form at least one supplementary symbol or a part of the control information is multiplexed with data in order to form at least one supplementary symbol and another part of the control information is multiplexed with data in order to form at least one other supplementary symbol.

According to a particular feature, the symbols included in the downlink sub frame that all terminals can receive are comprised in a nominal part of the downlink sub frame and the control information comprises, for each terminal, plural fields, at least a first field which indicates, for a first number of supplementary symbols, if all the multiplexing resources allocated to terminals for the reception and/or the transfer of symbols into a sub frame are or not allocated to the terminal and a second field which indicates, for a second number of supplementary symbols, if all the multiplexing resources allocated to terminals for the reception and/or the transfer of symbols into a sub frame are or not allocated to the terminal.

Since the features and advantages relating to the control information are the same as those set out above related to the methods and devices according to the invention, they will not be repeated here.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer program are the same as those set out above related to the methods and devices according to the invention, they will not be repeated here.

The characteristics of the invention will emerge more clearly from a reading of the following description of an example embodiment, the said description being produced with reference to the accompanying drawings, among which:

FIG. 10c is an example of the multiplexing resources of the wireless telecommunication system which are allocated in a third variant of realisation to the terminals according to the first and second modes of realisation of the present invention;

FIG. 12 is an example of the multiplexing resources of the wireless telecommunication system which are allocated according to the present invention to the terminals according to the third mode of realisation of the present invention;

FIGS. 13a to 13b show control information which convey information indicating the allocated multiplexing resources according to the present invention which are transferred by the base station to terminals;

FIG. 13c is correspondence table which shows the correspondence between each short identifier of a terminal and the identifier of the terminal;

FIGS. 13d to 13f show control information which convey information indicating the allocated multiplexing resources according to the present invention which are transferred by the base station to terminals;

Figure 1:
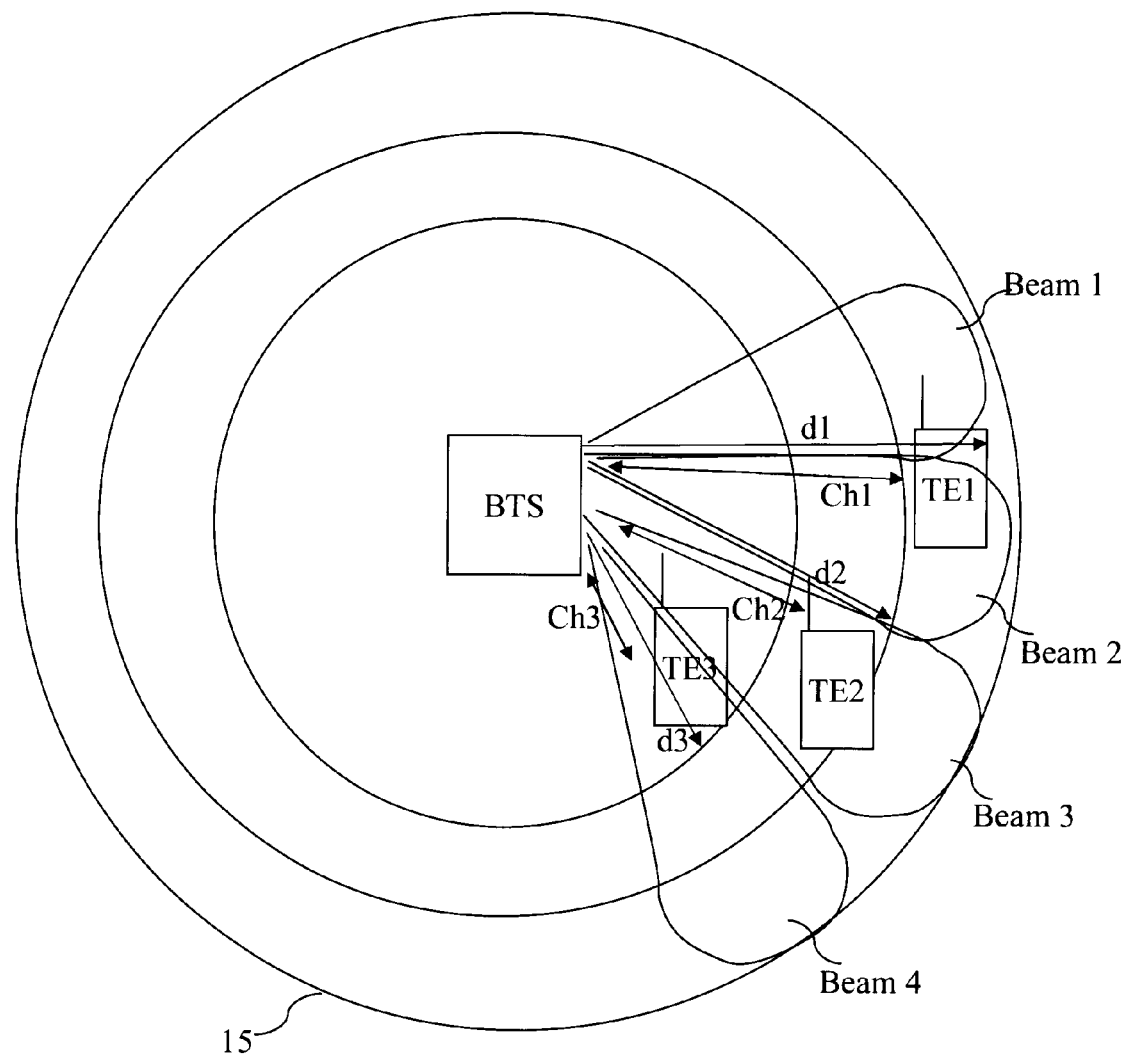
FIG. 1 is a diagram representing the architecture of the wireless telecommunication system in which the present invention is implemented.

In the telecommunication system of the FIG. 1, at least one and preferably plural terminals TE1, TE2 and TE3 are comprised in a coverage area 15 of a base station BTS. The base station BTS intends to communicate with at least one terminal TEi, here three terminals TE1, TE2 and TE3, over wireless communication channels Ch1 to Ch3 respectively.

The present invention will be described in a wireless network like a wireless cellular network or a local area network but the present invention is also applicable to wired networks like power line networks.

Only one coverage area 15 of the base station BTS is shown in the FIG. 1 for the sake of simplicity but in practice, and especially when the wireless network is a wireless cellular network, the wireless cellular telecommunication system is composed of plural base stations and cells.

Only three terminals TE are shown in the FIG. 1 for the sake of simplicity but in practice, a more important number of terminals are in the coverage area 15 of the base station BTS.

The base station BTS is also named a node or a node B or an enhanced node B or an access point.

The terminals TE1 to TE3 are terminals like mobile phones, personal digital assistants, or personal computers.

Figure 6:
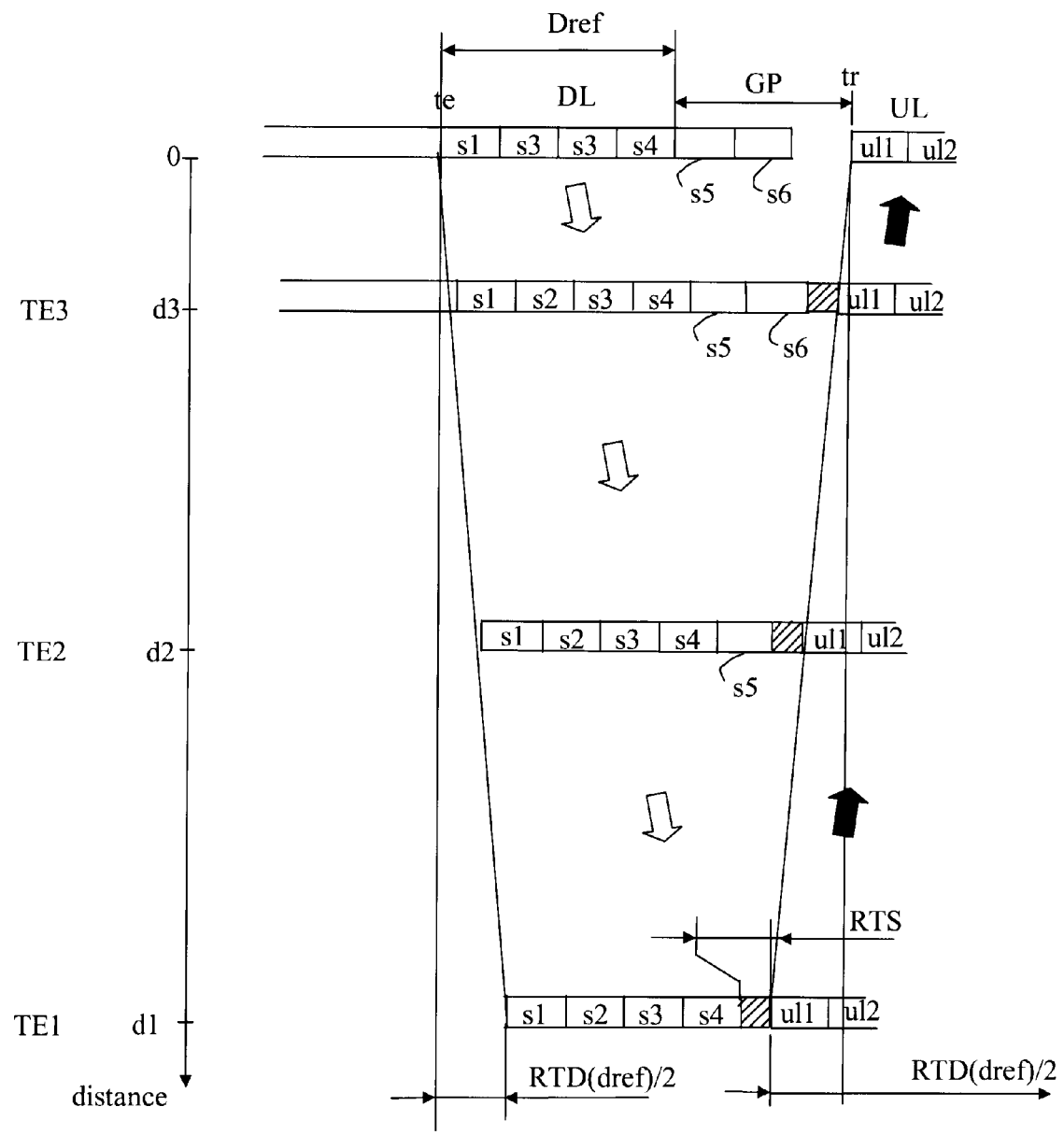
FIG. 6 is a chronogram depicting the transmission of information in the downlink of a telecommunication system according to the state of the art.

As it has been disclosed in the FIG. 6, the base station BTS is provided for including supplementary downlink symbols, said supplementary downlink symbols being intended to be transmitted only to the terminals TE that can receive and process them during the respective time delay thereof. The base station BTS is also provided for including supplementary uplink symbols, said supplementary uplink symbols being intended to be transmitted only by the terminals TE that can process and transmit them during the respective time delay thereof.

The base station BTS can insert information for a terminal TEi in $n_{dl}$ supplementary symbols. This condition can be mathematically written as follows:

if $n_{dl} \cdot ts_{dl} \leq TD(d) - RTS < (n_{dl}+1)ts_{dl}$ then insert at most $n_{dl}$ supplementary symbols.

$ts_{dl}$ being the duration of one downlink symbol.

According to the examples of the FIGS. 1 and 6, the number $N_{dl}$max is two, but a more important number of supplementary symbols can be determined, as example, according to the coverage area of the base station BTS and/or according to the duration of OFDM symbols.

Similar formulas as the above mentioned formulas are used for supplementary uplink channels.

As example, the wireless telecommunication system is a wireless telecommunication system which uses Time Division Duplexing scheme (TDD) or Frequency Division Duplexing scheme (FDD), more precisely half duplex FDD scheme.

In TDD scheme, the signals transferred in uplink and downlink channels are duplexed in different sub frames, named also time slots, in the same frequency band.

In half duplex FDD scheme, the signals transferred in uplink and downlink channels are duplexed in different sub frames, named also time slots, in different frequency bands.

When the base station BTS transfers symbols to a terminal TEi, with i=1 to 3, the data, the signals or the messages are transferred through downlink sub frames of the downlink channel.

When a terminal TEi, with i=1 to 3, transfers symbols to the base station BTS, the signals or data are transferred through uplink sub frames of the uplink channel.

In a first mode of realisation of the present invention, Frequency Division Multiple Access technique is used in the wireless telecommunication system in order to multiplex information of plural terminals TE.

In a second mode of realisation of the present invention, Code Division Multiple Access technique is used in the wireless telecommunication system in order to multiplex information of plural terminals TE.

In a third mode of realisation of the present invention, Space Division Multiple Access technique is used in the wireless telecommunication system in order to multiplex information of plural terminals TE. The Beams noted Beam1, Beam2, Beam3 and Beam4 in the FIG. 1 represent a part of the space division of the coverage area1 5 of the base station BTS.

It has to be noted that the techniques used in the first and/or second and/or third modes of realisation can be also combined.

Preferably, when a terminal TEi transfers a symbol, the terminal TEi multiplexes data on allocated multiplexing resources, and sets null value on multiplexing resources which are not allocated to it.

The base station BTS receives symbols. Each received symbol is formed by the symbols transferred by at least a part of the terminals TE.

Figure 2:
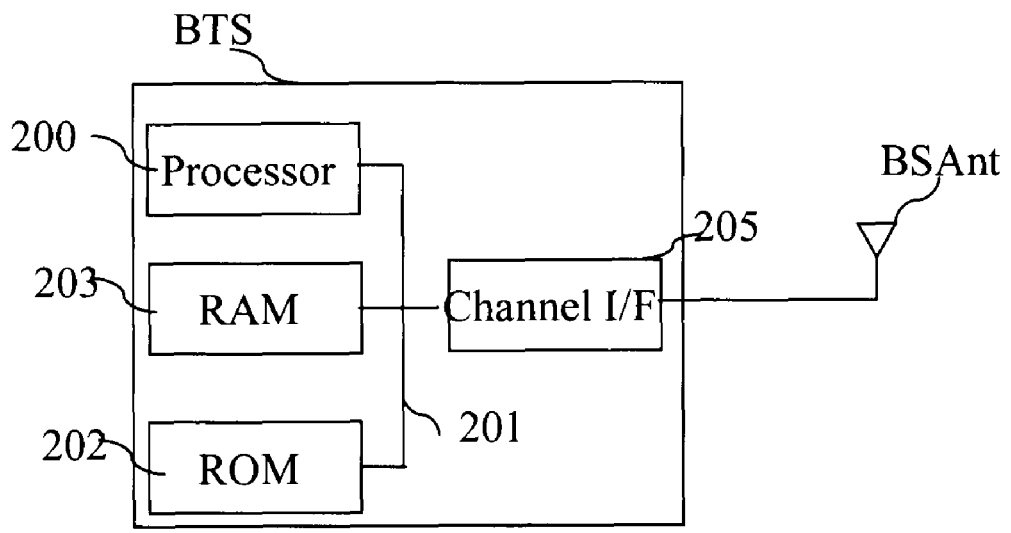
FIG. 2 is a diagram representing the architecture of a base station of the wireless telecommunication system according to the present invention.

FIG. 2 is a diagram representing the architecture of a base station according to the present invention.

Figure 7:
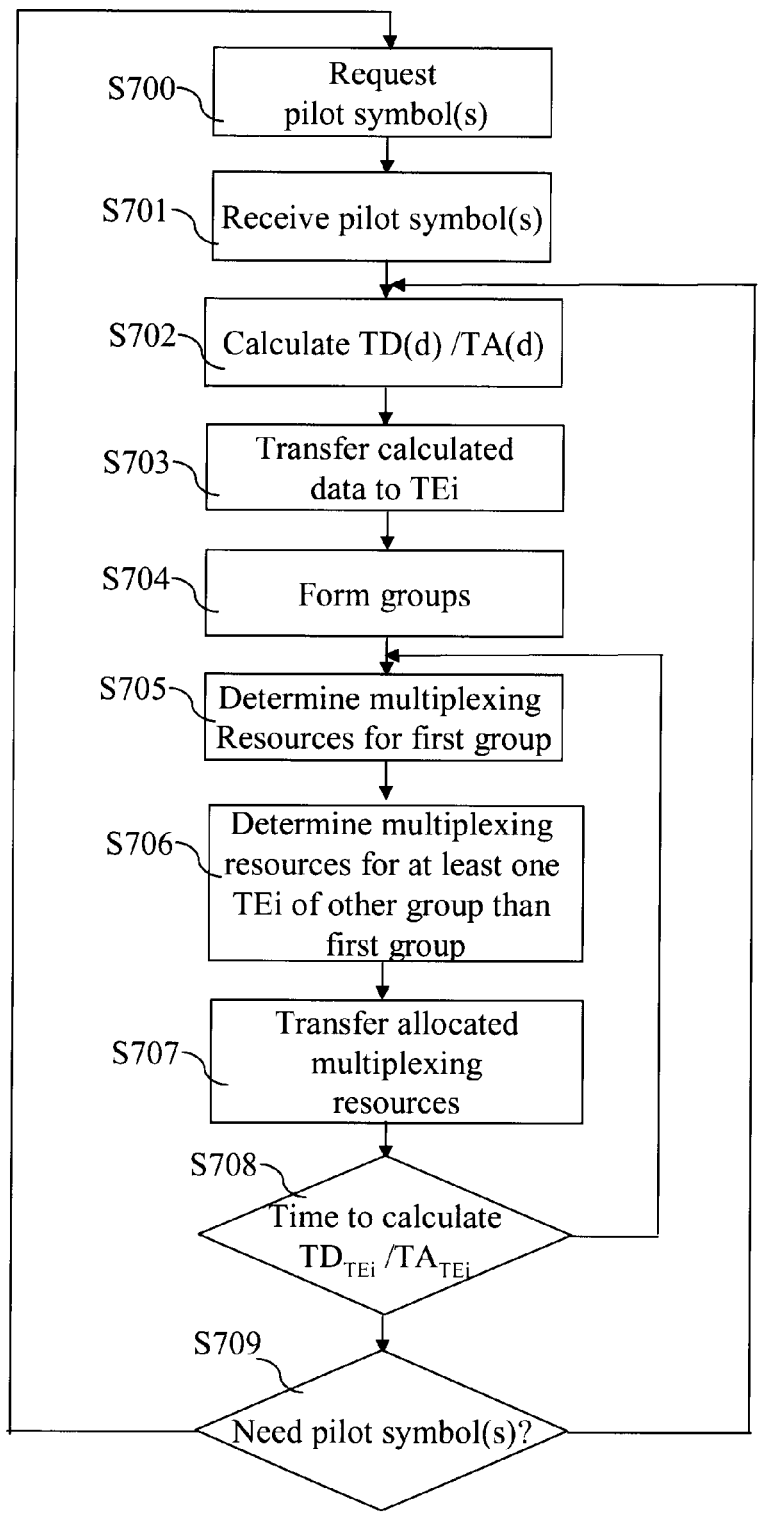
FIG. 7 is a an algorithm executed by a base station according to the present invention.

The base station BTS has, for example, an architecture based on components connected together by a bus 201 and a processor 200 controlled by the program related to the algorithm as disclosed in the FIG. 7.

It has to be noted here that the base station BTS is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203 and a channel interface 205.

The read only memory ROM 202 contains instructions of the programs related to the algorithm as disclosed in the FIG. 7 which are transferred, when the base station BTS is powered on to the random access memory RAM 203.

The RAM memory 203 contains registers intended to receive variables, and the instructions of the programs related to the algorithm as disclosed in the FIG. 7.

The channel interface 205 comprises means for requesting the transmission of at least one pilot symbol by each terminal TEi and means for receiving at least one pilot symbol from each terminal TEi.

The multiplexing resources allocated to at least a part of the terminals TE which belong to the first group are the multiplexing resources used by the corresponding terminal TEi for de multiplexing the downlink symbols of the nominal part of a downlink sub frame and/or are the multiplexing resources used by the corresponding terminal TEi for multiplexing the uplink symbols of the nominal part of an uplink sub frame.

The multiplexing resources allocated to the at least one terminal TEi which belongs to the other group are the multiplexing resources used by the base station BTS for multiplexing the supplementary downlink symbols and/or are the multiplexing resources used by the base station BTS for de multiplexing the supplementary uplink symbols.

The channel interface 205 comprises means for multiplexing each downlink symbol of the downlink sub frame to be transferred to at least a part of the terminals TE which belong to the first group on multiplexing resources allocated to the corresponding terminals TE.

The channel interface 205 comprises means for multiplexing at least one downlink supplementary symbol to be transferred to at least one terminal TEi on multiplexing resources allocated to the at least one terminal TEi belonging to the other group. The at least one supplementary symbol is multiplexed on multiplexing resources allocated to the terminals TE belonging to the first group.

The channel interface 205 comprises means for de multiplexing at least one uplink supplementary symbol transferred by at least one terminal TEi which belongs to the other group from the multiplexing resources allocated to that terminal TEi.

A supplementary symbol can either be a downlink symbol and/or an uplink symbol.

According to the third mode of realisation of the present invention, the channel interface 205 comprises means for directing the signals transferred by the base station BTS into different areas as the areas noted Beam1 to Beam4 in the FIG. 1. More precisely, when the base station BTS transmits signals into a given area through the downlink channel, the signals are N times duplicated, where N>1, the duplicated signals are weighted in order to perform beamforming, i.e. controls the spatial direction of the transmitted signals.

Through the channel interface 205, the processor 200 transfers control information as the one which will be disclosed hereinafter in reference to the FIG. 13a to 13f.

Figure 3:
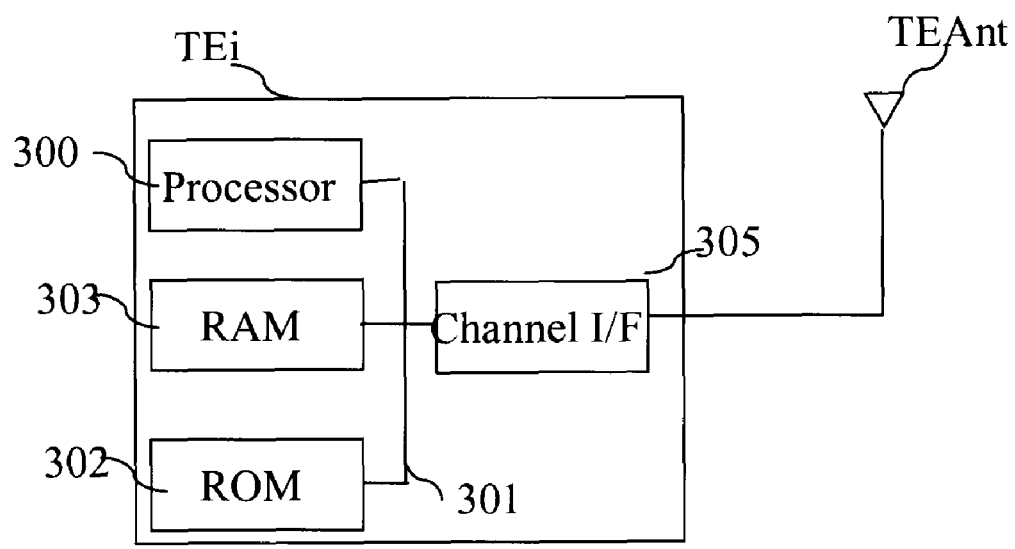
FIG. 3 is a diagram representing the architecture of a terminal the wireless telecommunication system according to the present invention.
Figure 4:
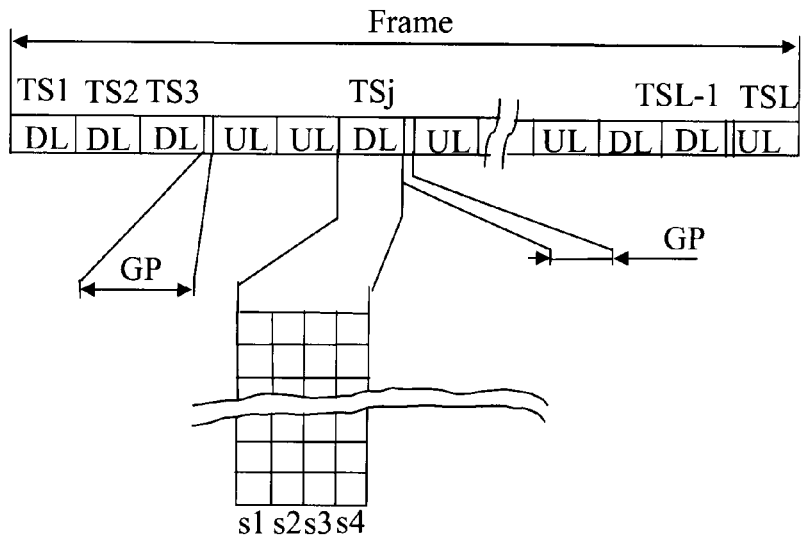
FIG. 4 is a chronogram depicting the structure of a conventional HD/OFDM frame.
Figure 5:
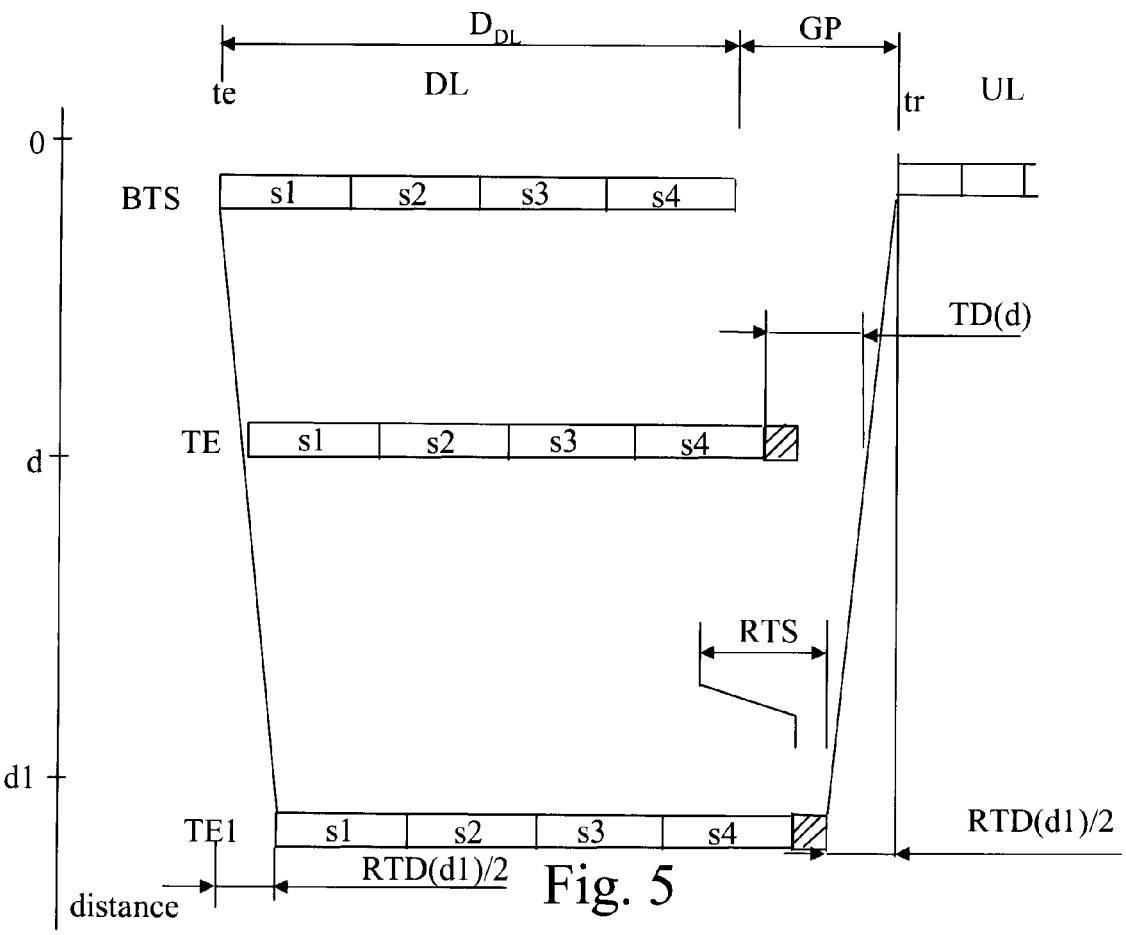
FIG. 5 is a chronogram depicting the transmission of information in the downlink of a telecommunication system according to the state of the art.

FIG. 3 is a diagram representing the architecture of a terminal according to the present invention.

Figure 8:
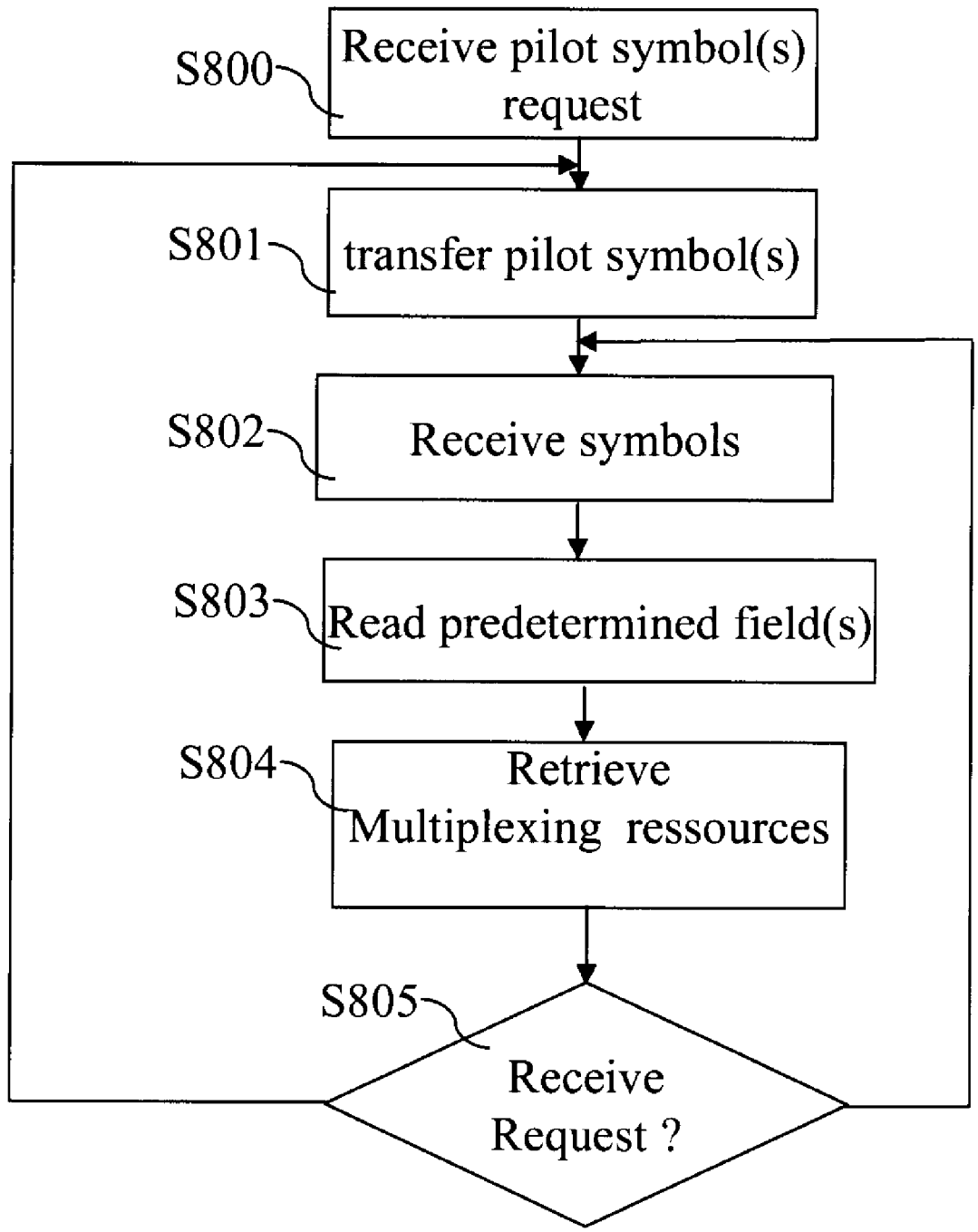
FIG. 8 is a an algorithm executed by a terminal according to the present invention.

Each terminal TEi, as example the terminal TE1, has, for example, an architecture based on components connected together by a bus 301 and a processor 300 controlled by programs related to the algorithm as disclosed in the FIG. 8.

It has to be noted here that the terminal TE1 is, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303 and a channel interface 305.

The read only memory ROM 302 contains instructions of the program related to the algorithm as disclosed in the FIG. 8 which are transferred, when the terminal TE1 is powered on to the random access memory RAM 303.

The RAM memory 303 contains registers intended to receive variables, and the instructions of the program related to the algorithm as disclosed in the FIG. 8.

The channel interface 305 comprises means for receiving at least one pilot symbol request from the base station BTS and means for transferring at least one pilot symbol to the base station BTS.

Through the channel interface 305, the processor 300 receives control information as the one which will be disclosed hereinafter in reference to the FIGS. 13a to 13f.

The channel interface 305 comprises means for de-multiplexing each downlink symbol of the nominal part Dref of the downlink sub frame received by the terminal TE1 if the terminal TE1 belongs to the first group on corresponding multiplexing resources allocated by the base station BTS if there are some.

The channel interface 305 comprises means for de-multiplexing at least one supplementary downlink symbol received by the terminal TE1 if the terminal TE1 belongs to the second group.

The channel interface 305 comprises means for multiplexing at least one uplink supplementary symbol transferred by the terminal TE1 if the terminal TE1 belongs to the other group.

FIG. 7 is an algorithm executed by a base station according to the present invention.

The present algorithm is executed by at least one base station BTS of the wireless telecommunication system. More precisely, the present algorithm is executed by the processor 200 of the base station BTS.

At step S700, the processor 200 commands the transfer, through the channel interface 205, of at least one pilot symbol by each terminal TEi, with i=1 to 3.

At next step S701, the processor 200 detects, through the channel interface 205, the reception of at least one pilot symbol transferred by each terminal TEi.

At next step S702, the processor 200 calculates a timing delay TD(d) for each terminal TEi, where d is the distance between the base station BTS and the terminal TEi.

Each timing delay TD(d) is calculated using the following formula:

$TD(d)=tr-te-D_{DL}-RTD(d)=GP-RTD(d), D_{DL}$ being the total duration of the nominal part of the downlink sub frame to be transferred.

At the same step, the processor 200 calculates, for each terminal TEi, the Timing Advance using the following formula:

$TA(d)=GP-TD(d)$.

At next step S703, the processor 200 commands the transfer of at least one of the data calculated at step S702 to each corresponding terminal TEi.

The data calculated at step S702 will be transferred by the channel interface 205 in the next downlink sub frame. The calculated data will be multiplexed with other data and transferred under the form of symbols s1 to s4.

At next step S704, the processor 200 forms at least two groups of terminals TE.

For that, the processor 200 determines, for each terminal TEi, the number $n_{dlTEi}$ of supplementary downlink symbols that the base station BTS can allocate to the terminal TEi using the following formula:

$n_{dlTEi}=\text{integer}\{(TD(d)-RTS)/ts_{dl}\}=\text{integer}\{(GP-RTD(d)-RTS)/ts_{dl}\}$ where $ts_{dl}$ is the duration of one downlink symbol.

It has to be noted here that $n_{dlTEi}$ is also representative of the number of supplementary uplink symbols that the base station BTS can allocate to the terminal TEi.

The processor 200 forms a first group which comprises at least the terminals TE of which $n_{dlTEi}$ is strictly lower than one and at least one other group which comprises the terminals TE of which $n_{dlTEi}$ is larger than or equal to one.

According to the first variant of the present invention, the first group comprises the terminals TE of which $n_{dlTEi}$ is equal to or upper than null value, i.e. all the terminals TE, and the at least one other group is a second group which comprises the terminals TE of which $n_{dlTEi}$ is maximum.

According to the second variant of the present invention, the first group comprises the terminals TE of which $n_{dlTEi}$ is equal to or upper than null value, and plural other groups are formed, at least a second group which comprises the terminals TE of which $n_{dlTEi}$ is equal to a first value and a third group which comprises the terminals TE of which $n_{dlTEi}$ is equal to a second value different from the first value.

As example, the second group comprises the terminals TE of which $n_{dlTEi}$ is equal to one and the third group comprises the terminals TE of which $n_{dlTEi}$ is equal to two.

In another example, the second group comprises the terminals TE of which $n_{dlTEi}$ is equal to three and the third group comprises the terminals TE of which $n_{dlTEi}$ is equal to six.

According to the third variant of the present invention, the first group comprises the terminals TE of which $n_{dlTEi}$ is lower than or equal to a first value and plural other groups are formed, at least a second group which comprises the terminals TE of which $n_{dlTEi}$ is equal to a first value and a third group which comprises the terminals TE of which $n_{dlTEi}$ is equal to a second value different from the first value.

As example, the first value is equal to one and the second value is equal to two.

In another example, the first value is equal to two and the second value is equal to four.

According to a fourth variant of the present invention, the first group comprises the terminals TE of which $n_{dlTEi}$ is equal to null value and plural other groups are formed at least a second group which comprises the terminals TE of which $n_{dlTEi}$ is equal to a first value and a third group which comprises the terminals TE of which $n_{dlTEi}$ is equal to a second value.

It has to be noted here that, on other variants, the processor 200 forms more than two other groups which comprise respectively terminals TE of which $n_{dlTEi}$ is comprised within different values.

At next step S705, the processor 200 allocates the multiplexing resources of the wireless telecommunication system to at least a part of the terminals TEi which belong to the first group.

It has to be noted here that, when several hundreds of terminals TE belong to the first group, the processor 200 can allocate, for a sub frame, the multiplexing resources to only a part of the terminals TE which belong to the first group. The processor 200 may then modify, for each sub frame, the terminals TE of the first group to which multiplexing resources are allocated.

Figures 9, 10A, 10B:
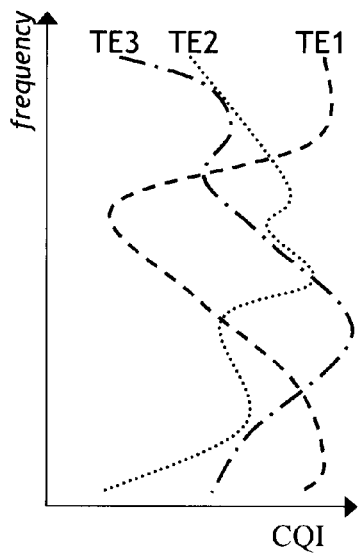
FIG. 9 is an example of the channel quality indication determined between the base station and each terminal according to the first and second modes of realisation of the present invention.
FIG. 10a is an example of the multiplexing resources of the wireless telecommunication system which are allocated in a first variant of realisation of the present invention to the terminals according to the first and second modes of realisation of the present invention.
FIG. 10b is an example of the multiplexing resources of the wireless telecommunication system which are allocated in a second variant of realisation of the present invention to the terminals according to the first and second modes of realisation of the present invention.

According to the first and second modes of realisation of the present invention, the processor 200 preferably allocates the multiplexing resources of the wireless telecommunication system to the terminals TE which belong to the first group according to the channel quality indications as shown in the FIG. 9.

The multiplexing resources are, according to the first mode of realisation of the present invention, chunks of frequencies. A chunk of frequencies comprises at least one carrier frequency or comprises a group of carrier frequencies which are preferably consecutive.

The multiplexing resources are, according to the second mode of realisation of the present invention, codes. A code is a sequence of bits. Preferably the allocated codes are orthogonal from each other.

Examples of allocated multiplexing resources will be described in reference to the FIGS. 10a to 10c.

The multiplexing resources are, according to the third mode of realisation of the present invention, areas of the coverage areal 5 of the base station BTS.

An Example of allocated multiplexing resources will be described in reference to the FIG. 12.

Figure 11:
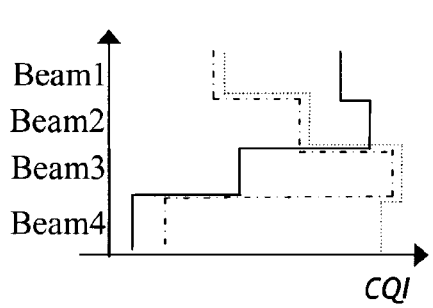
FIG. 11 is an example of the channel quality indication determined between the base station and each terminal according to the third mode of realisation of the present invention.

According to the third mode of realisation of the present invention, the processor 200 preferably allocates the multiplexing resources of the wireless telecommunication system to the terminals TE which belong to the first group according to the channel quality indications as shown in the FIG. 11.

The multiplexing resources allocated to each terminal TEi which belongs to the first group are the multiplexing resources used by the base station BTS for multiplexing the downlink symbols, like s1 to s4 of the FIG. 6, of the nominal part of the downlink sub frame.

The multiplexing resources allocated to each terminal TEi which belongs to the first group are the multiplexing resources used by the corresponding terminal TEi for de multiplexing the downlink symbols, like s1 to s4 of the FIG. 6, of the nominal part Dref of a sub frame.

At next step S706, the processor 200 allocates all the multiplexing resources of the wireless telecommunication system allocated to the part of the terminals TE belonging to the first group to at least one terminal TEi which belongs to the other group.

The multiplexing resources allocated to at least one terminal TEi which belongs to the other group are all the multiplexing resources which are allocated at step S705 to the part of the terminals TE which belong to the first group.

The multiplexing resources are chunks of frequencies or codes or areas of the coverage area 15 of the base station BTS.

The multiplexing resources allocated to the at least one terminal TEi which belongs to the other group are the multiplexing resources used by the base station BTS for multiplexing the supplementary downlink symbols, like s5 and/or s6 of the FIG. 6, and/or for de multiplexing the supplementary uplink symbols.

At next step S707, the processor 200 commands the transfer of control information indicating the allocated multiplexing resources to the terminals TE through the channel interface 205.

Examples of the control information which convey information indicating the allocated multiplexing resources will be given in reference to the FIGS. 13a to 13f.

According to the example of the FIG. 6, the control information are multiplexed with the data transferred in the downlink sub frame under the form of symbols s1 to s4 or s1 to s5 or s1 to s6.

It has to the noted here that the symbols s5 and s6 can be coded simultaneously with the symbols s1 to s4 or each symbol s5 or s6 can be coded independently from the other symbols s1 to s4.

At next step S708, the processor 200 checks if it is time to calculate again for each terminal TEi the corresponding timing delay TD(d) and/or the Timing Advance TA(d). As example and in a non limitative way, the timing delay TD(d) and/or the Timing Advance TA(d) are calculated on demand or periodically like every second.

If it is time to calculate again the timing delays and/or the Timing Advances, the processor 200 moves to step S709 and executes again the present algorithm.

If it is not time to calculate again the timing delays and/or the Timing Advances, the processor 200 returns to step S705 and executes the steps S705 to S708 as far as it is time to calculate again the timing delays and/or the Timing Advances.

It has to be noted here that, the terminals TE to which multiplexing resources have been allocated for a sub frame may change each time the loop constituted by the steps S705 to S708 is executed. Also, the at least one terminal TEi to which multiplexing resources are allocated at step S706 can be replaced anytime by another terminal TEi belonging to the other group.

At step S709, the processor 200 checks whether or not pilot symbols need to be transferred by the terminals TE.

When the terminals TE transfer symbols in the uplink sub frames, the processor 200 can determine the Time Delay of the Timing Advance from these symbols. When the terminals TE don't transfer symbols in the uplink sub frames, the processor 200 needs to receive pilot symbols in order to determine the Time Delay or the Timing Advance.

If pilot symbols need to be transferred by the terminals TE, the processor 200 returns to step S700, otherwise the processor 200 returns to step S702.

FIG. 8 is an algorithm executed by a terminal according to the present invention.

The present algorithm is executed by each terminal TEi, where i=1 to 3, of the wireless telecommunication system. More precisely, the present algorithm is executed by the processor 300 of each terminal TEi.

At step S800, the processor 300 detects, through the channel interface 305, the reception of a request for transmission of at least one pilot symbol transferred by the base station BTS.

At next step S801, the processor 300 commands the transfer, through the channel interface 305, of at least one pilot symbol to the base station BTS.

At next step S802, the processor 300 detects the reception, through the channel interface 305, of downlink symbols. According to the distance between the terminal TEi and the base station BTS, the number of received symbols varies. According to the example of the FIG. 6, four to six symbols are received. Some of these symbols are included in the nominal part Dref of the downlink sub frame that all the terminals TE located in the coverage area 15 of the base station BTS can process, others are supplementary symbols comprised in the guard period if supplementary symbols are allocated.

At next step S803, the processor 300 reads at least one predetermined field of the control information comprised in the received symbols. Examples of predetermined fields will be given in reference to the FIGS. 13a to 13f.

The information comprised in the at least one predetermined field are information indicating the allocated multiplexing resources to the terminal TEi.

It has to be noted here that the received symbols may also comprise the timing delay TD(d) and/or the Timing Advance for the terminal TEi.

At next step S804, the processor 300 retrieves the information indicating the allocated multiplexing resources which are comprised in at least a field of the received control information.

More precisely, the processor 300 reads at least one field of a first control information comprising information indicating the multiplexing resources which may be allocated to the terminal and reads at least one field of a second control information comprising information indicating if all the multiplexing resources allocated to terminals TE comprised in the first group are allocated to the terminal TEi for at least one supplementary symbol to be received or transferred by the terminal TEi within the time delay.

According to the first variant, the second control information is multiplexed with data in order to form one symbol, preferably the first symbol, comprised in the nominal part of the downlink sub frame or is multiplexed with data in order to form at least a part of the symbols comprised in the nominal part of the downlink sub frame or is multiplexed with data in order to form at least one supplementary symbol.

According to the first variant, the second control information comprises a single field which indicates if all the multiplexing resources are allocated to the terminal TEi for at least one supplementary symbol to be received or transferred by the terminal TEi within the time delay.

The second control information comprises a single field which indicates, in another example, at least the number of supplementary symbols, the terminal TEi can transmit and/or receive within the time delay.

According to the second to the fourth variants, the second control information is multiplexed with data in order to form one symbol comprised in the nominal part of the downlink sub frame, as example the first symbol of the nominal part, or is multiplexed with data in order to form at least a part of the symbols comprised in the nominal part of the downlink sub frame or is multiplexed with data in order to form one supplementary symbol, as example the first supplementary symbol, or a part of the control information is multiplexed with data in order to form at least one supplementary symbol, as example the first supplementary symbol, and another part of the control information is multiplexed with data in order to form at least one other supplementary symbol.

At the same step, the processor 300 commands the transfer of information indicating the allocated multiplexing resources to the channel interface 305.

The channel interface 305 de-multiplexes each downlink symbols, like s1 to s4 of the FIG. 6, of the nominal part of the downlink sub frame received by the terminal TEi if the terminal TEi belongs to the first group from corresponding multiplexing resources allocated by the base station BTS if there are some.

The channel interface 305 de-multiplexes at least one supplementary downlink symbol, like s5 or s6 or s5 and s6 in the FIG. 6, received by the terminal TEi if all the multiplexing resources are allocated to the terminal TEi, from corresponding multiplexing resources allocated by the base station BTS if there are some and/or the channel interface 305 multiplexes at least one supplementary uplink symbol transferred by the terminal TEi if all the multiplexing resources are allocated to the terminal TEi on corresponding multiplexing resources allocated by the same base station BTS if there are some.

At next step S805, the processor 300 checks whether or not at least one pilot symbol needs to be received by the base station BTS.

If at least one pilot symbol needs to be received, the processor 300 returns to step S801, otherwise, the processor 300 returns to step S802.

FIG. 9 is an example of the channel quality indication determined between the base station and each terminal according to the first and the second modes of realisation of the present invention.

On the vertical axis of the FIG. 9, the frequency band is shown and the horizontal axis represents the value of the channel quality indications determined by each terminal TEi and reported to the base station BTS through the uplink channel in order to optimize the use of the downlink multiplexing resources.

In the FIG. 9, the curves of the channel quality indications determined by the terminals TE1 to TE3 are shown.

Such curves are used by the base station BTS for allocating the multiplexing resources to the terminals TE1 to TE3.

For the uplink channels, the base station BTS determines the channel quality indications on each uplink channel in order to optimize the use of the uplink multiplexing resources.

FIG. 10a is an example of the multiplexing resources of the wireless telecommunication system which are allocated in a first variant of realisation of the present invention to the terminals according to the first and second modes of realisation of the present invention.

According to the first variant, the first group comprises all the terminals TE and the at least one other group is a second group which comprises the terminals TE which can receive or transmit the maximum number of supplementary symbols.

The FIG. 10a discloses an example wherein four symbols are comprised in the nominal part of the downlink sub frame and two symbols are supplementary symbols.

The FIG. 10a represents a table of twelve lines noted 1001 to 1012 and six columns noted 1051 to 1056. Each line 1001 to 1012 represents a chunk of frequencies according to the first mode of realisation or a code according to the second mode of realisation, each column 1051 to 1056 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1051 represents the symbol s1, the column 1052 represents the symbol s2, the column 1053 represents the symbol s3, the column 1054 represents the symbol s4, the column 1055 represents the supplementary symbol s5 and the column 1056 represents the supplementary symbol s6.

The first group determined by the base station BTS comprises the terminals TE1 to TE3 of which $n_{dlTEi}$ is equal to or upper than null value.

The base station BTS allocates to the terminal TE1 the chunks of frequencies or the codes noted 1001 to 1003 and 1010 to 1012 for the symbols s1 to s4.

The base station BTS allocates to the terminal TE2 the chunks of frequencies or the codes noted 1004 to 1006 for the symbols s1 to s4.

The base station BTS allocates to the terminal TE3 the chunks of frequencies or the codes noted 1007 to 1009 for the symbols s1 to s4.

The base station BTS allocates the same chunks of frequencies or codes to a terminal TEi for all of the symbols s1 to s4 comprised in the nominal part of the downlink sub frame of the FIG. 6.

The base station BTS allocates to the terminal TE3, for the supplementary symbols s5 and s6, the multiplexing resources which have been allocated for the symbols comprised in the nominal part of the downlink sub frame to the terminals TE comprised in the first group. More precisely, all the chunks of frequencies or codes allocated to the terminals comprised in the first group are allocated for the symbols s5 and s6 to the terminal TE3 of which $n_{dlTEi}$ is equal to two.

FIG. 10b is an example of the multiplexing resources of the wireless telecommunication system which are allocated in a second variant of realisation of the present invention to the terminals according to the first and second modes of realisation of the present invention.

According to the second variant, the first group comprises all the terminals TE and at least two other groups are formed, at least a second group which comprises the terminals TE which can receive and/or transmit a first number of supplementary symbols and a third group which comprises the terminals TE which can receive and/or transmit a second number of supplementary symbols.

The FIG. 10b discloses an example wherein four symbols are comprised in the nominal part of the downlink sub frame and two symbols are supplementary symbols.

The FIG. 10b represents a table of twelve lines noted 1101 to 1112 and six columns noted 1151 to 1156. Each line 1101 to 1112 represents a chunk of frequencies according to the first mode of realisation or a code according to the second mode of realisation, each column 1151 to 1156 represents a symbol. Such table is preferably generated for each sub frame.

It has to be noted here that a more important number of chunks of frequencies or codes can be allocated in the present invention or a reduced number of chunks of frequencies or codes can be allocated in the present invention.

The column 1151 represents the symbol s1, the column 1152 represents the symbol s2, the column 1153 represents the symbol s3, the column 1154 represents the symbol s4, the column 1155 represents the supplementary symbol s5 and the column 1156 represents the supplementary symbol s6.

The first group determined by the base station BTS comprises the terminals TE1 to TE3 of which $n_{dlTEi}$ is equal to or upper than null value.

The base station BTS allocates to the terminal TE1 the chunks of frequencies or the codes noted 1101 to 1103 and 1110 to 1112 for the symbols s1 to s4.

The base station BTS allocates to the terminal TE2 the chunks of frequencies or the codes noted 1104 to 1106 for the symbols s1 to s4.

The base station BTS allocates to the terminal TE3 the chunks of frequencies or the codes noted 1107 to 1109 for the symbols s1 to s4.

The base station BTS allocates the same chunks of frequencies or codes to a terminal TEi for all of the symbols s1 to s4 comprised in the nominal part Dref of the downlink sub frame according to the example of the FIG. 6.

The base station BTS determines at least two other groups, at least a second group which comprises the terminals TE of which $n_{dITEi}$ is equal to one, i.e. the terminal TE2 and a third group which comprises the terminals TE of which $n_{dITEi}$ is equal to two, i.e. the terminal TE3.

The base station BTS allocates to the terminal TE2, for the supplementary symbol s5, the multiplexing resources which have been allocated for the symbols comprised in the nominal part of the downlink sub frame to the terminals TE comprised in the first group. More precisely, all the chunks of frequencies or codes of the sub-frame are allocated for the symbol s5 to the terminal TE2.

The base station BTS allocates to the terminal TE3, for the supplementary symbol s6, the multiplexing resources which have been allocated for the symbols comprised in the nominal part of the downlink sub frame to the terminals TE comprised in the first group. More precisely, the base station BTS allocates all the chunks of frequencies or codes of the sub-frame for the symbol s6 to the terminal TE3.

FIG. 10c is an example of the multiplexing resources of the wireless telecommunication system which are allocated in a third variant of realisation to the terminals according to the first and second modes of realisation of the present invention of the present invention.

According to the third variant, the first group comprises a part of the terminals TE which can receive and/or transmit at most a first number of supplementary symbols during the time delay and at least two other groups are formed, at least a second group which comprises the terminals TE which can receive and/or transmit the first number of supplementary symbols and a third group which comprises the terminals TE which can receive and/or transmit a second number of supplementary symbols.

The FIG. 10c discloses an example wherein four symbols are comprised in the nominal part of the downlink sub frame and two symbols are supplementary symbols.

The FIG. 10c represents a table of twelve lines noted 1201 to 1212 and six columns noted 1251 to 1256. Each line 1201 to 1212 represents a chunk of frequencies according to the first mode of realisation or a code according to the second mode of realisation, each column 1251 to 1256 represents a symbol of the FIG. 6. Such table is preferably generated for each sub frame.

It has to be noted here that a more important number of chunks of frequencies or codes can be allocated in the present invention or a reduced number of chunks of frequencies or codes can be allocated in the present invention.

The column 1251 represents the symbol s1, the column 1252 represents the symbol s2, the column 1253 represents the symbol s3, the column 1254 represents the symbol s4, the column 1255 represents the supplementary symbol s5 and the column 1256 represents the supplementary symbol s6.

The first group determined by the base station BTS comprises the terminals TE1 and TE2 of which $n_{dITEi}$ is lower than or equal to one.

The base station BTS allocates to the terminal TE1 the chunks of frequencies or the codes noted 1201 to 1203 and 1210 to 1212 for the symbols s1 to s4.

The base station BTS allocates to the terminal TE2 the chunks of frequencies or the codes noted 1204 to 1209 for the symbols s1 to s4.

The base station BTS allocates the same chunks of frequencies or codes to a terminal TEi for all of the symbols s1 to s4 comprised in the nominal part Dref of the FIG. 6.

The base station BTS forms a second group which comprises the terminals TE of which $n_{dITEi}$ is equal to one, i.e. the terminal TE2 and a third group which comprises the terminals TE of which $n_{dITEi}$ is equal to two, i.e. the terminal TE3.

The base station BTS allocates to the terminal TE2, for the supplementary symbol s5, the multiplexing resources which have been allocated for the symbols comprised in the nominal part of the downlink sub frame to the terminals TE comprised in the first group. More precisely, the base station BTS allocates to the terminal TE2 all the chunks of frequencies or the codes of the sub-frame for the supplementary symbol s5. The base station BTS allocates all the chunks of frequencies or codes of the sub-frame for the symbol s6 to the terminal TE3.

FIG. 11 is an example of the channel quality indication determined between the base station and each terminal according to the third mode of realisation of the present invention.

On the vertical axis of the FIG. 11, the different beams Beam1 to Beam4 are shown and the horizontal axis represents the value of the channel quality indications determined by each terminal TEi and reported to the base station BTS through the uplink channel in order to optimize the use of the downlink multiplexing resources.

In the FIG. 11, the curves of the channel quality indications determined by the terminals TE1 to TE3 are shown.

Such curves are used by the base station BTS for allocating the multiplexing resources to the terminals TE1 to TE3.

For the uplink channels, the base station BTS determines the channel quality indications on each uplink channel in order to optimize the use of the uplink multiplexing resources.

FIG. 12 is an example of the multiplexing resources of the wireless telecommunication system which are allocated according to the present invention to the terminals according to the third mode of realisation of the present invention.

The FIG. 12 discloses an example wherein four symbols are comprised in the nominal part of the downlink sub frame and two symbols are supplementary symbols.

The FIG. 12 represents a table of four lines noted 121 to 124 and six columns noted 125 to 130. Each line 121 to 124 represents a beam or an area in which signals are directed by the base station BTS according to the third mode of realisation, each column 125 to 130 represents a symbol of the FIG. 6. Such table is preferably generated for each sub frame.

The column 125 represents the symbol s1, the column 126 represents the symbol s2, the column 127 represents the symbol s3, the column 128 represents the symbol s4, the column 129 represents the supplementary symbol s5 and the column 130 represents the supplementary symbol s6.

The first group determined by the base station BTS comprises the terminals TE 1, TE2 and TE3 of which $n_{dITEi}$ is equal to or upper than null value.

The base station BTS allocates to the terminal TE1 the Beam1 and the Beam2 noted 121 and 122 for the symbols s1 to s4.

The base station BTS allocates to the terminal TE2 the Beam3 noted 123 for the symbols s1 to s4.

The base station BTS allocates to the terminal TE3 the Beam4 noted 124 for the symbols s1 to s4.

The base station BTS forms a second group which comprises the terminals TE of which $n_{dITEi}$ is equal to one, i.e. the terminal TE2 and a third group which comprises the terminals TE of which $n_{dTE_i}$ is equal to two, i.e. the terminal TE3.

The base station BTS allocates to the terminal TE2, for the supplementary symbol s5, the multiplexing resources which have been allocated for the symbols comprised in the nominal part of the downlink sub frame to the terminals TE comprised in the first group. More precisely, the base station BTS allocates to the terminal TE2 all the beams 121 to 124 of the sub-frame for the supplementary symbol s5. The base station BTS allocates all the beams 121 to 124 of the sub-frame for the supplementary symbol s6 to the terminal TE3.

It has to be noted here that the different allocation schemes shown in reference to the FIG. 10 in the first and second modes of realisation of the present invention are also applicable to the third mode of realisation.

FIGS. 13a to 13f show control information which convey information indicating the allocated multiplexing resources according to the present invention which are transferred by the base station to terminals.

The FIG. 13a discloses a first example of the control information which convey information indicating the allocated multiplexing resources for terminals TE belonging to the first group.

The FIG. 13a discloses an example wherein four symbols are comprised in the nominal part of the downlink sub frame and two symbols are supplementary symbols.

The control information is preferably multiplexed with other data in order to form at least one symbol, as example the first symbol s1, comprised in the nominal part of the downlink sub frame or is multiplexed with other data in order to form at least a part of the symbols, s1 to s4 according to the example of the FIG. 6, comprised in the nominal part of the downlink sub frame.

The control information comprises as many lines as there are terminals TE in the coverage area 15. According to the example of the FIG. 1, the control information comprises three lines noted 1301 to 1303. Each line comprises a first field which comprises the identifier noted ID TEi of the terminal TEi and a second field. The second field comprises as many bits as there are multiplexing resources. The binary value of each bit indicates to the terminal TEi which multiplexing resources the base station BTS has allocated to it.

Referring to the example of the FIG. 10a, the binary sequence "111000000111" comprised in the second field of the line 1301 indicates to the terminal TE1 that the base station BTS has allocated to it the chunks of frequencies or codes 1001 to 1003 and 1010 to 1012. The binary sequence "000111000000" comprised in the second field of the line 1302 indicates to the terminal TE2 that the base station BTS has allocated to it the chunks of frequencies or codes 1004 to 1006. The binary sequence "000000111000" comprised in the second field of the line 1303 indicates to the terminal TE3 that the base station BTS has allocated to it the chunks of frequencies or codes 1007 to 1009.

The FIG. 13b discloses a second example of the control information which convey information indicating the allocated multiplexing resources for terminals belonging to the first group.

The FIG. 13b discloses an example wherein four symbols are comprised in the nominal part of the downlink sub frame and two symbols are supplementary symbols.

The control information is preferably multiplexed with other data in order to form at least one symbol, as example the first symbol s1, comprised in the nominal part of the downlink sub frame or is multiplexed with other data in order to form at least a part of the symbols, s1 to s4 according to the example of the FIG. 6, comprised in the nominal part of the downlink sub frame.

The control information comprises as many lines as there are multiplexing resources. The column 1305 comprises the identifier of each multiplexing resource and the column 1306 comprises the short identifier of the terminal TEi to which the multiplexing resource identified in the same line is allocated.

A short identifier is a binary sequence which replaces the identifier of a terminal TEi for at least one sub frame.

The FIG. 13c is a correspondence table which shows the correspondence between the short identifier of each terminal to which multiplexing resources are allocated and the identifier of the terminal.

The FIG. 13c discloses an example wherein four symbols are comprised in the nominal part of the downlink sub frame and two symbols are supplementary symbols.

The correspondence table is determined at each sub frame and transferred through the downlink channels to the terminals TE. The correspondence table comprises as many lines as there are terminals TE to which multiplexing resources are allocated.

According to the example of the FIG. 1, as only three terminals TE are comprised in the coverage area 15 multiplexing resources are allocated to each terminal TEi, each short identifier consists in a sequence of two bits. "01" identifies the terminal TE1, "10" identifies the terminal TE2 and "11" identifies the terminal TE3.

Referring to the example of the FIG. 13b, the multiplexing resources noted "1" to "3" and "10" to "12" are allocated to the terminal TE1, the multiplexing resources noted "4" to "6" are allocated to the terminal TE2, the multiplexing resources noted "7" to "9" are allocated to the terminal TE3.

According to the first and second modes of realisation of the present invention, the multiplexing resources 1 to 12 correspond respectively to the chunks of frequencies 1001 to 1012 of the FIG. 10a, 1101 to 1112 of the FIG. 10b and 1201 to 1212 of the FIG. 10c.

The FIG. 13d discloses a first example of the control information which conveys information indicating the allocated multiplexing resources of at least one terminal belonging to another group according to the first variant of realisation.

According to the example of the FIG. 13d, the multiplexing resources allocated to one terminal TEi comprised in the other group are allocated for all the supplementary symbols.

More precisely, the control information comprises, for each terminal, a single field which indicates if all the multiplexing resources allocated to the terminals TE comprised in the first group are allocated to the terminal TEi for all the supplementary symbols.

The control information is multiplexed with data in order to form at least one symbol comprised in the nominal part of the downlink sub frame or is multiplexed with data in order to form at least one supplementary symbol, as example the first supplementary symbol.

The FIG. 13d discloses an example wherein four symbols are comprised in the nominal part of the downlink sub frame and two symbols are supplementary symbols.

The control information is multiplexed with other data in order to form one symbol s1 comprised in the nominal part of the downlink sub frame or is multiplexed with other data in order to form at least a part of the symbols s1 to s4 comprised in the nominal part of the downlink sub frame or is multiplexed with other data in order to form the first supplementary symbol s5.

The control information comprises as many lines as there are terminals TE to which multiplexing resources are allocated for a sub frame. The control information comprises three lines 1307 to 1309. Each line comprises a field which comprises a flag which indicates to the corresponding terminal TEi if the multiplexing resources are allocated to the terminal TEi for all the supplementary symbols s5 and s6.

Lines 1307 and 1308 indicate that no supplementary symbol is allocated to the terminals TE1 and TE2, line 1309 indicates that all the supplementary symbols are allocated to the terminal TE3.

The base station allocates to the terminal TE3, for the supplementary symbols s5 and s6, the multiplexing resources which have been allocated for the symbols comprised in the nominal part of the downlink sub frame to the terminals TE comprised in the first group. More precisely, all the chunks of frequencies or codes allocated to the terminals belonging to the first group are allocated for the supplementary symbols s5 and s6 to the terminal TE3 of which $n_{dlTEi}$ is maximum, i.e. $n_{dlTEi}$ according to the example of the FIG. 6.

The FIG. 13e discloses a second example of the control information which conveys information indicating the allocated multiplexing resources of at least one terminal TEi belonging to another group according to the first variant of realisation.

According to the example of the FIG. 13e, the multiplexing resources allocated to one terminal TEi comprised in the other group are allocated for all the supplementary symbols.

More precisely, the control information comprises, for each terminal, a single field which indicates if all the multiplexing resources allocated to the terminals TE comprised in the first group are allocated to the terminal TEi for all the supplementary symbols.

The control information is multiplexed with data in order to form one symbol comprised in the nominal part of the downlink sub frame or is multiplexed with data in order to form at least a part of the symbols comprised in the nominal part of the downlink sub frame or is multiplexed with data in order to form at least a supplementary symbol, as example the first supplementary symbol.

The FIG. 13e discloses an example wherein four symbols are comprised in the nominal part of the downlink sub frame and two symbols are supplementary symbols.

The control information is multiplexed with other data in order to form one symbol s1 comprised in the nominal part of the downlink sub frame or is multiplexed with other data in order to form at least a part of the symbols s1 to s4 comprised in the nominal part of the downlink sub frame or is multiplexed with other data in order to form the first supplementary symbol s5.

The control information comprises as many lines as there are terminals TE to which multiplexing resources are allocated for the sub frame. According to the example of the FIG. 10b, the control information comprises three lines. Each line comprises a predetermined field which comprises the number, as example in a binary form, of symbols the corresponding terminal TEi can receive through the downlink channel.

According to the example of the FIG. 10b, the terminal TE3 can receive six symbols, the base station BTS allocates for the supplementary symbols s5 and s6 to the terminal TE3 and no supplementary symbols to the terminals TE1 and TE2. From the value six, the terminal TE3 deduces that all the chunks of frequencies or codes are allocated for the symbols s5 and s6 to the terminal TE3.

In a variant, each line comprises a predetermined field which comprises the number, as example in a binary form, of supplementary symbols, the terminal TEi can receive in the downlink channel.

From the value two, the terminal TE3 deduces that all the chunks of frequencies or codes of the sub-frame are allocated for the symbols s5 and s6 to the terminal TE3.

The FIG. 13f discloses an example of the control information which conveys information indicating the allocated multiplexing resources of at least one terminal TEi belonging to another group according to the second or the third or the fourth variants of realisation.

According to the second or the third or the fourth variants of realisation, the multiplexing resources allocated to one terminal TEi comprised in the second group are allocated for a first number of supplementary symbols and the multiplexing resources allocated to another terminal TEi comprised in the third group are allocated for a second number of supplementary symbols.

More precisely, the second control information comprises, for each terminal, at least two fields, at least first field which indicates if the terminal TEi can use, for the first number of supplementary symbols, all the multiplexing resources which are allocated, for the sub frame, to the terminals TE comprised in the first group and a second field which indicates if the terminal TEi can use, for the second number of supplementary symbols, all the multiplexing resources which are allocated, for the sub frame, to the terminals TE comprised in the first group.

The control information is multiplexed with data in order to form one symbol comprised in the nominal part of the downlink sub frame or is multiplexed with data in order to form at least a part of the symbols comprised in the nominal part of the downlink sub frame or is multiplexed with data in order to form at least one supplementary symbol or a part of the control information is multiplexed with data in order to form at least one supplementary symbol and another part of the control information is multiplexed with data in order to form at least one other supplementary symbol.

The FIG. 13f discloses an example wherein four symbols are comprised in the nominal part of the downlink sub frame and two symbols are supplementary symbols.

The control information is multiplexed with other data in order to form one symbol s1 comprised in the nominal part of the downlink sub frame or is multiplexed with other data in order to form at least a part of the symbols s1 to s4 comprised in the nominal part of the downlink sub frame or is multiplexed with other data in order to form the first supplementary symbol s5 or the column 1310 of the control information is multiplexed with other data in order to form the first supplementary symbol s5 and the column 1311 of the control information is multiplexed with other data in order to form the second supplementary symbol s6.

The control information comprises as many lines as there are terminals TE in the coverage area 15 to which multiplexing resources are allocated. According to the example of the FIG. 1, the control information comprises three lines. The columns 1310 and 1311 comprise as many flags as there are terminals TE in the coverage area 15.

According to the FIG. 10b, the base station BTS allocates to the terminal TE2, for the supplementary symbol s5, the multiplexing resources which have been allocated for the symbols comprised in the nominal part of the downlink sub frame to the terminals TE comprised in the first group.

The flag comprised in the second field of the column 1310 is then at the binary value 1, the first and third cells of the column 1310 are then at the binary value 0. From that flag, the terminal TE2 determines that all the chunks of frequencies or codes of the sub-frame are allocated for the supplementary symbol s5 to itself.

According to the FIG. 10*b*, the base station BTS allocates to the terminal TE3, for the supplementary symbol s6, the multiplexing resources which have been allocated for the symbols comprised in the nominal part of the downlink sub frame to the terminals TE comprised in the first group.

The flag comprised in the third field of the column 1311 is then at the binary value 1, the first and second cells of the column 1311 are then at the binary value 0. From that flag, the terminal TE3 determines that all the chunks of frequencies or codes of the sub-frame are allocated for the symbol s6 to itself.

It has to be noted here that the FIG. 13 has been disclosed for supplementary downlink symbols. The present invention is also applicable for supplementary uplink symbols.

In such case, the control information which convey information indicating the allocated multiplexing resources for at least one terminal TEi belonging to another group, is multiplexed with other data in order to form the first symbol s1 comprised in the nominal part of the downlink sub frame or is multiplexed with other data in order to form at least a part of the symbols s1 to s4 comprised in the nominal part of the downlink sub frame.

Naturally, many modifications can be made to the embodiments of the invention described above without departing from the scope of the present invention.

The invention claimed is:

1. A transmission method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to at least two terminals, the method comprising:

determining, at the base station, the time delay of each terminal connected thereto, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance;

enabling, at the base station, the transfer of at least one supplementary symbol between the base station and at least one terminal that can receive or transmit said at least one supplementary symbol during the time delay;

forming a first group of terminals and at least another group of at least one terminal, the first group of terminals comprising at least terminals which can not receive and/or transmit said at least supplementary symbol during the time delay, the other group of at least one terminal comprising at least a terminal which can receive and/or transmit said at least supplementary symbol during the time delay;

allocating multiplexing resources of the wireless telecommunication network to at least a part of the terminals comprised in the first group for a sub frame;

allocating all the multiplexing resources allocated to the terminals comprised in the first group to one terminal comprised in the other group for at least one supplementary symbol; and transferring at least one control information which convey information indicating the allocated multiplexing resources to the terminals.

2. The method according to claim 1, wherein the multiplexing resources of the wireless telecommunication network are chunks of frequencies and/or codes and/or areas of a coverage area of the base station.

3. The method according to claim 2, wherein the symbols included in the downlink sub frame that all terminals can receive are comprised in a nominal part of the downlink sub frame, and in that a first control information which convey information indicating the allocated multiplexing resources is transferred to each terminal, the control information being multiplexed with data in order to form at least one symbol comprised in the nominal part of the downlink sub frame.

4. The method according to any of claims 1 to 3, further comprising:

determining, the number of supplementary symbols that can be received or transmitted by each terminal.

5. The method according to claim 4, wherein the first group comprises all the terminals and the at least one other group is a second group which comprises the terminals which can receive or transmit the maximum number of supplementary symbols.

6. The method according to claim 5, wherein the multiplexing resources allocated to one terminal comprised in the other group are allocated for all the supplementary symbols.

7. The method according to claim 6, wherein a second control information is transferred, the second control information is multiplexed with data in order to form at least one symbol comprised in the nominal part of the downlink sub frame or is multiplexed with data in order to form at least one supplementary symbol.

8. The method according to claim 7, wherein the second control information comprises, for each terminal, a single field which indicates if all the multiplexing resources allocated to the terminals comprised in the first group are allocated to the terminal for all the supplementary symbols.

9. The method according to claim 7, wherein the second control information comprises, for each terminal, a single field which indicates at least the number of supplementary symbols, the terminal can transmit and/or receive.

10. The method according to claim 4, wherein the first group comprises all the terminals and plural other groups are formed, at least a second group which comprises the terminals which can receive and/or transmit a first number of supplementary symbols and at least a third group which comprises the terminals which can receive and/or transmit a second number of supplementary symbols.

11. The method according to claim 10, wherein the multiplexing resources allocated to one terminal comprised in the second group are allocated for the first number of supplementary symbols and the multiplexing resources allocated to another terminal comprised in the third group are allocated for the second number of supplementary symbols.

12. The method according to claim 11, wherein a second control information is transferred, the second control information is multiplexed with data in order to form at least one symbol comprised in the nominal part of the downlink sub frame or is multiplexed with data in order to form at least one supplementary symbol or a part of the control information is multiplexed with data in order to form at least one supplementary symbol and another part of the control information is multiplexed with data in order to form at least one other supplementary symbol.

13. The method according to claim 12, wherein the second control information comprises, for each terminal, plural fields, at least a first field which indicates if the terminal can use, for the first number of supplementary symbols, all the multiplexing resources which are allocated to the terminals comprised in the first group to which multiplexing resources are allocated for the sub frame and a second field which indicates if the terminal can use, for the second number of supplementary symbols, all the multiplexing resources which are allocated to the terminals comprised in the first group.

14. The method according to claim 4, wherein the first group comprises a part of the terminals which can receive at most a first number of supplementary symbols during the time delay and plural other groups are formed, at least a second group which comprises the terminals which can receive and/or transmit the first number of supplementary symbols and a third group which comprises the terminals which can receive and/or transmit a second number of supplementary symbols.

15. A transmission method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to plural terminals, the terminal being able to transfer and/or receive at least one supplementary symbol during a time delay, the time delay being such that any terminal after receiving all the symbols included in a downlink sub frame followed by an uplink sub frame may transmit other symbols over said uplink sub frame with said time delay so that the other symbols susceptible to be transmitted should be received by the base station at a time separated from the end of the transmission by the base station of the downlink sub frame by a predefined guard period constant whatever said distance, the method comprising:

receiving, at the terminal and from the base station, symbols comprising at least a first and a second control information which convey information indicating the multiplexing resources allocated to the terminal;

reading, at the terminal, at least one field of the first control information comprising information indicating the multiplexing resources which may be allocated to the terminal for a sub frame, multiplexing and/or de-multiplexing symbols included into a sub frame according to the allocated multiplexing resources for the multiplex and/or the de multiplex of the symbols included into an uplink and/or a downlink sub frame if multiplexing resources are allocated to the terminal;

reading, at the terminal, at least one field of the second control information comprising information indicating if all the multiplexing resources allocated to other terminals for a sub frame are allocated to the terminal for at least one supplementary symbol; and multiplexing and/or de-multiplexing, at the terminal, the at least one supplementary symbol if all the multiplexing resources are allocated to the terminal for the at least one supplementary symbol.

16. The method according to claim 15, wherein the symbols included in the downlink sub frame that all terminals can receive are comprised in a nominal part of the downlink sub frame, and in that the second control information is multiplexed with data in order to form at least one symbol comprised in the nominal part of the downlink sub frame or is multiplexed with data in order to form at least one supplementary symbol.

17. The method according to claim 16, wherein the second control information comprises a single field which indicates if all the multiplexing resources are allocated to the terminal for the at least one supplementary symbol.

18. The method according to claim 16, wherein the second control information comprises a single field which indicates at least the number of supplementary symbols the terminal can transmit and/or receive.

19. The method according to claim 15, wherein the symbols included in the downlink sub frame that all terminals can receive are comprised in a nominal part of the downlink sub frame, and in that the second control information is multiplexed with data in order to form at least one symbol comprised in the nominal part of the downlink sub frame or is multiplexed with data in order to form at least one supplementary symbol or a part of the control information is multiplexed with data in order to form at least one supplementary symbol and another part of the control information is multiplexed with data in order to form at least one other supplementary symbol.

20. A base station of a wireless telecommunication system, said base station being intended to communicate with terminals over communication channels, each channel carrying frames being divided into downlink sub frames and uplink sub frames, each downlink sub frame including a number of symbols intended to be transmitted to at least two terminals, said base station comprising:

means for determining the time delay of each terminal connected thereto, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance;

means for enabling the transfer of at least one supplementary symbol between the base station and at least one terminal that can receive or transmit said at least one supplementary symbol during the time delay;

means for forming a first group of terminals and at least another group of at least one terminal, the first group of terminals comprising at least terminals which can not receive and/or transmit said at least supplementary symbol for the time delay, the other group of at least one terminal comprising at least a terminal which can receive and/or transmit said at least supplementary symbol for the time delay;

means for allocating multiplexing resources of the wireless telecommunication network to at least a part of the terminals comprised in the first group;

means for allocating all the multiplexing resources allocated to the terminals comprised in the first group to one terminal comprised in the other group for at least one supplementary symbol; and means for transferring at least one control information which convey information indicating the allocated multiplexing resources to the terminals.

21. A terminal of a wireless telecommunication system being intended to communicate with a base station over communication channels, each channel carrying frames being divided into downlink sub frames and uplink sub frames, each downlink sub frame including a number of symbols intended to be transmitted to plural terminals, the terminal being able to transfer and/or receive at least one supplementary symbol during a time delay, the time delay being such that any terminal after receiving all the symbols included in a downlink sub frame followed by an uplink sub frame may transmit other symbols over said uplink sub frame with said time delay so that the other symbols susceptible to be transmitted should be received by the base station at a time separated from the end of the transmission by the base station of the downlink sub frame by a predefined guard period constant whatever said distance, said terminal comprising:

means for receiving, from the base station, symbols comprising at least a first and a second control information which convey information indicating the multiplexing resources allocated to the terminal;

means for reading at least one field of the first control information comprising information indicating the multiplexing resources which may be allocated to the terminal for a sub frame;

means for multiplexing and/or de-multiplexing symbols included into an uplink and/or a downlink sub frame according to the allocated multiplexing resources for the multiplex and/or the de multiplex of the symbols included into an uplink and/or a downlink sub frame if multiplexing resources are allocated to the terminal;

means for reading at least one field of the second control information comprising information indicating if all the multiplexing resources allocated to other terminals for a sub frame are allocated to the terminal for at least one supplementary symbol; and means for multiplexing and/or de-multiplexing the at least one supplementary symbol if all the multiplexing resources are allocated to the terminal for the at least one supplementary symbol.

22. A non-transitory computer readable storage medium encoded with computer executable instructions, which when executed by a base station, cause the base station to perform a method in a wireless telecommunication system including at least the base station which is intended to communicate with terminals over bidirectional communication channels, each channel supporting frames being divided into downlink sub frames and uplink sub frames, each downlink sub frame including a number of symbols intended to be transmitted to at least two terminals, the method comprising:

determining the time delay of each terminal connected thereto, said time delay being such that any terminal after having received all the symbols included in a downlink sub frame followed by an uplink sub frame may transmit other symbols over said uplink sub frame with said time delay so that the other symbols susceptible to be transmitted should be received by said base station at a time separated from the end of the transmission by the base station of the downlink sub frame by a predefined guard period constant whatever said distance;

enabling the transfer of at least one supplementary symbol between the base station and at least one terminal that can receive or transmit said at least one supplementary symbol during the time delay;

forming a first group of terminals and at least another group of at least one terminal, the first group of terminals comprising at least terminals which can not receive and/or transmit said at least supplementary symbol during the time delay, the other group of at least one terminal comprising at least a terminal which can receive and/or transmit said at least supplementary symbol during the time delay;

allocating multiplexing resources of the wireless telecommunication network to at least a part of the terminals comprised in the first group for a sub frame;

allocating all the multiplexing resources allocated to the terminals comprised in the first group to one terminal comprised in the other group for at least one supplementary symbol; and transferring at least one control information which convey information indicating the allocated multiplexing resources to the terminals.

23. A non-transitory computer readable storage medium encoded with computer executable instructions, which when executed by a terminal, cause the terminal to perform a method in a wireless telecommunication system including at least a base station intended to communicate with terminals over bidirectional communication channels, each channel supporting frames being divided into downlink sub frames and uplink sub frames, each downlink sub frame including a number of symbols intended to be transmitted to plural terminals, the terminal being able to transfer and/or receive at least one supplementary symbol during a time delay, the time delay being such that any terminal after receiving all the symbols included in a downlink sub frame followed by an uplink sub frame may transmit other symbols over said uplink sub frame with said time delay so that the other symbols susceptible to be transmitted should be received by the base station at a time separated from the end of the transmission by the base station of the downlink sub frame by a predefined guard period constant whatever said distance, the method comprising:

receiving, from the base station, symbols comprising at least a first and a second control information which convey information indicating the multiplexing resources allocated to the terminal;

reading at least one field of the first control information comprising information indicating the multiplexing resources which may be allocated to the terminal for a sub frame, multiplexing and/or de-multiplexing symbols included into a sub frame according to the allocated multiplexing resources for the multiplex and/or the de multiplex of the symbols included into an uplink and/or a downlink sub frame if multiplexing resources are allocated to the terminal;

reading at least one field of the second control information comprising information indicating if all the multiplexing resources allocated to other terminals for a sub frame are allocated to the terminal for at least one supplementary symbol; and multiplexing and/or de-multiplexing, at the terminal, the at least one supplementary symbol if all the multiplexing resources are allocated to the terminal for the at least one supplementary symbol.

* * * * *